(12) United States Patent
Hirai

(10) Patent No.: US 7,588,806 B2
(45) Date of Patent: *Sep. 15, 2009

(54) HOMEOTROPICALLY ALIGNED LIQUID CRYSTAL FILM AND PROCESS FOR PRODUCING THE SAME

(75) Inventor: Yoshiharu Hirai, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 11/634,134

(22) Filed: Dec. 6, 2006

(65) Prior Publication Data

US 2007/0128379 A1    Jun. 7, 2007

(30) Foreign Application Priority Data

Dec. 7, 2005   (JP)   ............................. 2005-353464

(51) Int. Cl.
 C09K 19/38   (2006.01)
 C09K 19/52   (2006.01)
 G02F 1/1337  (2006.01)

(52) U.S. Cl. ............... 428/1.2; 252/299.01; 252/299.61; 349/127; 349/130

(58) Field of Classification Search ................. 428/1.1, 428/1.2, 1.25, 1.26, 1.31, 1.5; 252/299.01, 252/299.61; 349/117, 123, 127, 130
See application file for complete search history.

(56) References Cited

U.S. PATENT DOCUMENTS

| 6,287,650 | B1 | 9/2001 | Pauluth et al. | |
|---|---|---|---|---|
| 7,407,691 | B2 | 8/2008 | Shundo et al. | 428/1.1 |
| 7,476,423 | B2 * | 1/2009 | Hirai | 428/1.1 |
| 7,488,519 | B2 * | 2/2009 | Hirai | 428/1.1 |
| 2005/0224754 | A1 | 10/2005 | Hirai et al. | |
| 2005/0224757 | A1 | 10/2005 | Syundo et al. | 252/299.61 |
| 2008/0241431 | A1 * | 10/2008 | Hirai | 428/1.31 |

FOREIGN PATENT DOCUMENTS

| JP | 2324382 | 10/1998 |
|---|---|---|
| JP | 2002/365635 | 12/2002 |
| JP | 2003/002927 | 1/2003 |
| JP | 2006/023656 | 1/2006 |
| JP | 2006/023657 | 1/2006 |
| WO | 2005/038517 | 4/2005 |

OTHER PUBLICATIONS

M.S. Park et al., "A New Polarizer with Wide Viewing Angle and Low Color Shift Characteristics designed for In-Plane-Switching Liquid Crystal Display (IPS-LCD)", IDW '04 FMC8-4, pp. 655-658.

Nakata et al., "P-58: Novel Optical Compensation Films for IPS-LCDs", SID '06 DIGEST P-58, pp. 420-423.

Quarterly Elements of Chemistry, No. 22, 1994 "Chemistry of Liquid Crystals".

Abstract of JP 10-319408, Dec. 4, 1998, corresponds to GB 2,324,382.

Abstract of JP 11-240890, Sep. 7, 1999, corresponds to US 6,287,650.

Abstract of JP 2006-126757, May 18, 2006, corresponds to US 2005/224754.

* cited by examiner

*Primary Examiner*—Shean C Wu
(74) *Attorney, Agent, or Firm*—Wenderoth, Lind & Ponack, L.L.P.

(57) ABSTRACT

The invention includes homeotropically aligned liquid crystal films obtained by applying a polymerizable liquid crystal composition containing at least one compound selected from the group consisting of polymerizable liquid crystal compounds represented by the following formula (1-1) to the following formula (1-3) onto a substrate having a polar surface, and polymerizing the composition:

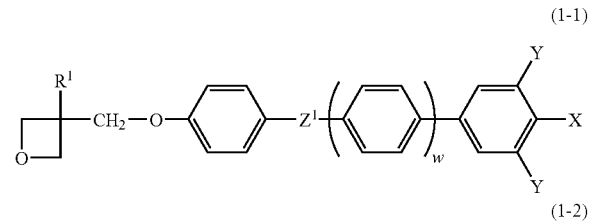

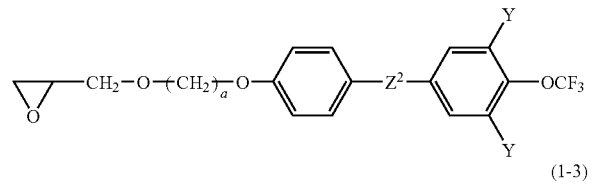

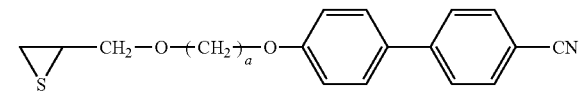

wherein $R^1$ is methyl or ethyl; $Z^1$ is a single bond, —COO—, —OCO—, —CH=CH—COO— or —CH$_2$CH$_2$—COO—; $Z^2$ is —COO— or —OCO—; each Y is independently hydrogen or fluorine; X is —OCF$_3$ or —CN; w is 0, 1 or 2; and a is an integer of 1 to 10.

36 Claims, No Drawings

HOMEOTROPICALLY ALIGNED LIQUID CRYSTAL FILM AND PROCESS FOR PRODUCING THE SAME

BACKGROUND OF THE INVENTION

1. Field of the Invention

The present invention relates to homeotropically aligned liquid crystal films, a process for producing the same and uses of the liquid crystal films.

2. Description of the Related Art

In recent years, it has been proposed to apply polarizing plates or phase plates using liquid crystals having photopolymerizablity to optical elements. Such optical elements are obtained by polymerizing polymerizable liquid crystals having optical anisotropy in a liquid crystal state to fix alignment of the liquid crystals. After the polymerizable liquid crystals are subjected to proper alignment control in the liquid crystal state, they can be polymerized with keeping their alignment state. Therefore, by fixing the alignment vector of the liquid crystal skeleton in an alignment state, such as homogeneous alignment (horizontal alignment), tilt alignment (inclined alignment), homeotropic alignment (vertical alignment) or twisted alignment (distorted alignment), polymers having various optical anisotropies can be obtained. The expression "exhibiting such alignment as above" is sometimes referred to as "having homogeneous alignment", "having tilt alignment", "having homeotropic alignment" or "having twisted alignment" simply hereinafter.

In the polymer having homeotropic alignment, the direction of the optical axis is $n_z$ direction, and the refractive index in the direction of the optical axis is larger than that in the direction crossing the direction of the optical axis at right angles, so that in the index ellipsoid, the polymer is classified into positive C-plate. By combining the positive C-plate with a film having another optical function, it can be applied to optical compensation of horizontally aligned liquid crystal mode, i.e., so-called IPS (in-plane switching) mode, for example, improvement in viewing angle properties of polarizing plates (see, for example, M. S. Park, et al., IDW'04 FMC8-4; M. Nakata, et al., SID'06 P-58; and WO 05/38517A1).

As a method to form such homeotropic alignment, there has been proposed, for example, a method of applying a surface active agent having a long-chain alkyl group, a coupling agent, a metal complex or the like onto a substrate such as a glass substrate or a method of using a side chain type liquid crystal polymer (see, for example, Quarterly Elements of Chemistry, No. 22 "Chemistry of Liquid Crystals", edited by The Chemical Society of Japan, pp. 99-100 (1994); Japanese Patent Laid-Open Publication No. 319408/1998; Japanese Patent Laid-Open Publication No. 240890/1999; Japanese Patent Laid-Open Publication No. 365635/2002; and Japanese Patent Laid-Open Publication No. 2927/2003).

In the conventional methods, however, there reside various problems such that uniformity or stability of the homeotropic alignment is insufficient, the number of steps required for film production is increased, and coating failures such as repelling and pinhole take place when the polymerizable liquid crystal is applied. Further, there is another problem that if a polyimide based polymer film for vertical alignment, which is used for a liquid crystal device, is formed on a substrate such as a glass substrate and baked at a temperature of about 200° C. (to promote imidization), it is impossible to apply a polymerizable liquid crystal composition onto the resulting baked surface. In addition, there is another problem that if an optical plastic film such as a film of TAC (triacetyl cellulose) or a norbornene resin is selected as a substrate, the film cannot be used under the aforesaid baking temperature conditions from the viewpoint of heat resistance.

The present inventors have found so far that a polymerizable liquid crystal film having homeotropic alignment can be obtained by irradiating a polymerizable liquid crystal layer composed of a polymerizable liquid crystal composition containing an acrylate based polymerizable liquid crystal compound and an organic silicon compound having primary amine with ultraviolet rays in an inert atmosphere and thereby curing the layer (see Japanese Patent Laid-Open Publication No. 126757/2006) In this method, however, there reside problems of complicated production process and high cost because it is necessary to form an inert atmosphere in the curing stage.

In order to solve the above problems, the present inventors have found a polymerizable liquid crystal composition containing a liquid crystal compound having a polymerizable epoxy (cyclic ether) group (see Japanese Patent Laid-Open Publication No. 23656/2006 and Japanese Patent Laid-Open Publication No. 23657/2006). In case of polymerizable liquid crystal compounds having the same polymerizable groups as each other, however, sufficient curability is not obtained occasionally, or the cost becomes high because of specific structures of the compounds.

SUMMARY OF THE INVENTION

The present inventors have earnestly studied in order to solve the above problems and have accomplished the present invention having the following constitutions.

[1] A homeotropically aligned liquid crystal film obtained by applying a polymerizable liquid crystal composition containing at least one compound selected from the group consisting of polymerizable liquid crystal compounds represented by the following formula (1-1) to the following formula (1-3) onto a substrate having a polar surface and polymerizing the composition:

(1-1)

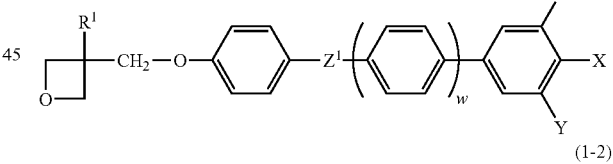

(1-2)

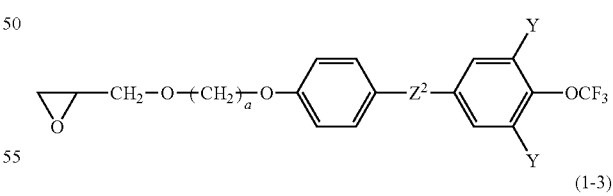

(1-3)

wherein $R^1$ is methyl or ethyl; $Z^1$ is a single bond, —COO—, —OCO—, —CH=CH—COO— or —CH$_2$CH$_2$—COO—; $Z^2$ is —COO— or —OCO—; each Y is independently hydrogen or fluorine; X is —OCF$_3$ or —CN; w is 0, 1 or 2; and a is an integer of 1 to 10.

[2] The liquid crystal film as stated in [1], wherein the polymerizable liquid crystal composition contains at least one compound selected from the group consisting of polymerizable liquid crystal compounds represented by the formula (1-1) to the formula (1-3) and at least one compound selected from the group consisting of polymerizable liquid crystal compounds represented by the following formula (2-1) and the following formula (2-2):

$$\text{(2-1)}$$

$$\text{(2-2)}$$

wherein each $R^2$ is independently methyl or ethyl; $Z^3$ is a single bond or —O—; $Z^4$ to $Z^7$ are each independently —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; $L^1$ to $L^4$ are each independently hydrogen, fluorine, chlorine, methyl, trifluoromethyl or cyano; m is an integer of 0 to 10, and when m is 0, $Z^3$ is a single bond; n is 0 or 1; $A^1$ is 1,4-phenylene, 3-methyl-1,4-phenylene, 2-trifluoromethyl-1,4-phenylene, 3-trifluoromethyl-1,4-phenylene, 2,3-bis(trifluoromethyl)-1,4-phenylene, 3,5-dimethylbiphenyl-4,4'-diyl, 3,5-dimethylterphenyl-4,4''-diyl, 9-methylfluorene-2,7-diyl or 9,9-dimethylfluorene-2,7-diyl; and $A^2$ is any one of groups represented by the following formulas:

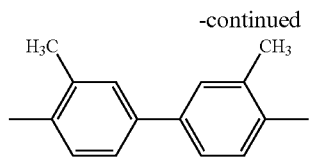

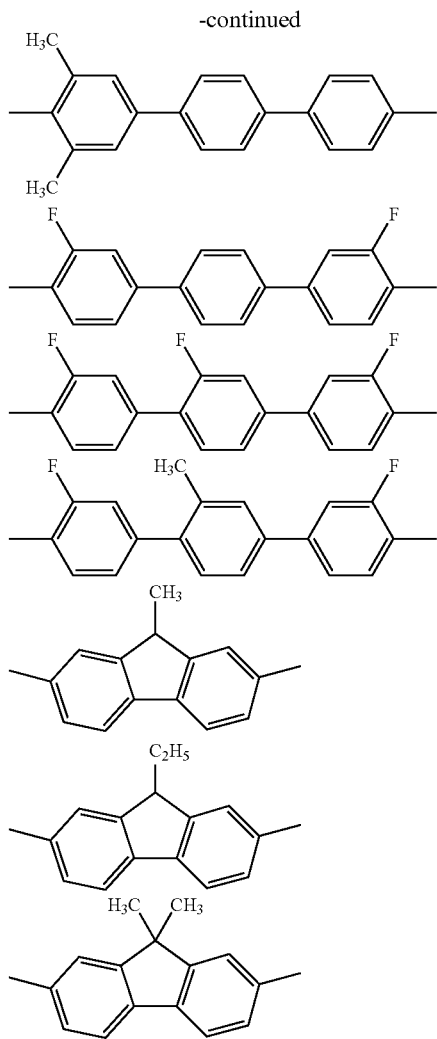

[3] The liquid crystal film as stated in [2], wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, and in the formula (2-1) and the formula (2-2), each $R^2$ is independently methyl or ethyl; $Z^3$ is a single bond or —O—; $Z^4$ to $Z^7$ are each independently —COO—, —OCO—, —CH$_2$CH$_2$COO—, —OCOCH$_2$CH$_2$—, —CH=CHCOO— or —OCOCH=CH—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 2-trifluoromethyl-1,4-phenylene, 3-trifluoromethyl-1,4-phenylene, 2,3-bis(trifluoromethyl)-1,4-phenylene, 9-methylfluorene-2,7-diyl or 9,9-dimethylfluorene-2,7-diyl; and $A^2$ is any one of groups represented by the following formulas:

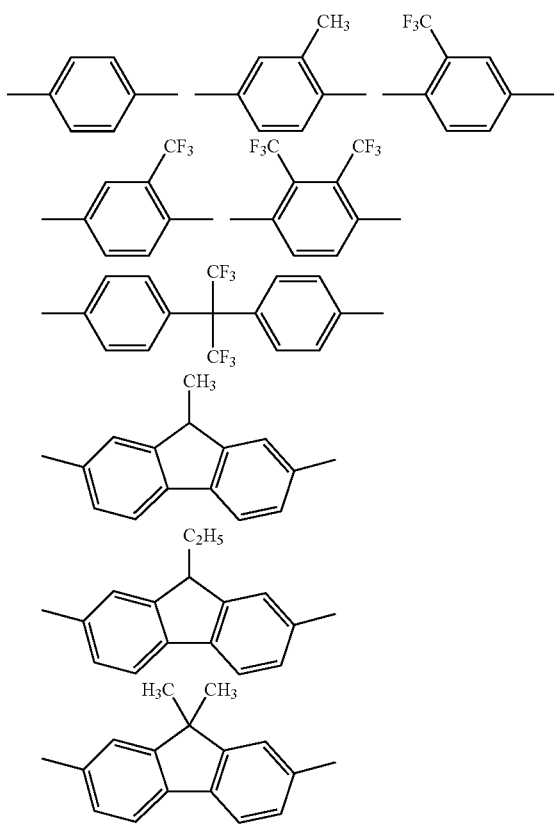

[4] The liquid crystal film as stated in [2], wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, and in the formula (2-1) and the formula (2-2), $Z^3$ is a single bond or —O—; $Z^4$ and $Z^5$ are each independently —COO—, —OCO—, —CH$_2$CH$_2$COO—, —OCOCH$_2$CH$_2$—, —CH=CHCOO— or —OCOCH=CH—; $Z^6$ and $Z^7$ are each independently —COO—, —OCO—, —CH$_2$CH$_2$COO— or —OCOCH$_2$CH$_2$—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 9-methylfluorene-2,7-diyl or 9,9-dimethylfluorene-2,7-diyl; and $A^2$ is 9-methylfluorene-2,7-diyl or 9,9-dimethylfluorene-2,7-diyl.

[5] The liquid crystal film as stated in [2], wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, in the formula (2-1) and the formula (2-2), $Z^3$ is a single bond or —O—; $Z^4$ is —COO—; $Z^5$ is —OCO—; $Z^6$ is —COO—; $Z^7$ is —OCO—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 9-methylfluorene-2,7-diyl or 9,9-dimethylfluorene-2,7-diyl; and $A^2$ is 9-methylfluorene-2,7-diyl or 9,9-dimethylfluorene-2,7-diyl, and the ratio of the compounds represented by the formula (1-1) to the formula (1-3) is in the range of 3 to 70% by weight based on the total amount 100% by weight of the compounds represented by the formula (1-1) to the formula (1-3) and the compounds represented by the formula (2-1) and the formula (2-2).

[6] The liquid crystal film as stated in [2], wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN; w is 0 or 1; and a is an integer of 1 to 10, in the formula (2-1), m is an integer of 0 to 3; n is 0; $Z^3$ is a single bond; $Z^4$ is —COO—; $L^1$ and $L^2$ are hydrogen; and $A^1$ is 1,4-phenylene, in the formula (2-2), $Z^3$ is a single bond or —O—; $Z^6$ is —COO—; $Z^7$ is —OCO—; $L^1$ to $L^4$ are each independently hydrogen or fluorine; m is an integer of 0 to 10, and when m is 0, $Z^3$ is a single bond; n is 0 or 1; and $A^2$ is 9-methylfluorene-2,7-diyl, and the ratio of the compounds represented by the formula (1-1) to the formula (1-3) is in the range of 5 to 50% by weight based on the total amount 100% by weight of the compounds represented by the formula (1-1) to the formula (1-3) and the compounds represented by the formula (2-1) and the formula (2-2).

[7] The liquid crystal film as stated in [6], wherein m in the formula (2-2) is an integer of 4 to 8, and the ratio of the compounds represented by the formula (1-1) to the formula (1-3) is in the range of 5 to 35% by weight based on the total amount 100% by weight of the compounds represented by the formula (1-1) to the formula (1-3) and the compounds represented by the formula (2-1) and the formula (2-2).

[8] The liquid crystal film as stated in any one of [1] to [7], wherein the substrate having a polar surface is a substrate having been surface-treated by any one treatment of a film-forming treatment using a polymer having a polar group, a corona treatment and a plasma treatment.

[9] The liquid crystal film as stated in any one of [1] to [7], wherein the substrate having a polar surface is a substrate having been surface-treated by a combination of two or more treatments of a film forming treatment using a polymer having a polar group, a corona treatment and a plasma treatment.

[10] The liquid crystal film as stated in [8] or [9], wherein the polymer having a polar group has a carboxyl group and/or an amino group in a molecular chain.

[11] The liquid crystal film as stated in [8] or [9], wherein the polymer having a polar group is a polyimide based polymer.

[12] The liquid crystal film as stated in [11], wherein the polyimide based polymer contains at least one component selected from the group consisting of polyamic acid, polyamic acid amide and polyamic acid ester.

[13] The liquid crystal film as stated in [11], wherein the polyimide based polymer is polyamic acid.

[14] The liquid crystal film as stated in [8] or [9], wherein the polymer having a polar group is a water-soluble silsesquioxane derivative having an amino group.

[15] The liquid crystal film as stated in [14], wherein the water-soluble silsesquioxane derivative having an amino group is a partial hydrolyzate of a silicon compound having an amino group-containing group and three hydrolyzable groups.

[16] The liquid crystal film as stated in [15], wherein the water-soluble silsesquioxane derivative having an amino group is a partial hydrolyzate of trialkoxysilane having an amino group.

[17] The liquid crystal film as stated in any one of [1] to [16], wherein the substrate is a glass substrate.

[18] The liquid crystal film as stated in any one of [1] to [16], wherein the substrate is a plastic substrate.

[19] The liquid crystal film as stated in [18], wherein the plastic substrate comprises polyimide, polyamideimide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyallylate, acrylic resin, polyvinyl alcohol, polypropylene, cellulose, triacetyl cellulose, partial saponification product of triacetyl cellulose, epoxy resin, phenolic resin or cycloolefin based resin.

[20] The liquid crystal film as stated in any one of [1] to [19], wherein the polymerizable liquid crystal composition contains a solvent, and the solvent contains a polar solvent in an amount of not less than 5% by weight based on the whole amount of the solvent.

[21] The liquid crystal film as stated in [20], wherein the polar solvent is at least one solvent selected from the group consisting of ketones, acetates, ethers, cellosolves, esters and alcohols.

[22] A process for producing a homeotropically aligned liquid crystal film, comprising applying the polymerizable liquid crystal composition of [1] onto a substrate having a polar surface and polymerizing the composition to form a homeotropically aligned state.

[23] The process as stated in [22], wherein the substrate having a polar surface is a substrate having been surface-treated by a film-forming treatment using a polymer having a polar group, and the resulting film is a film formed by baking a coating film composed of the polymer at a temperature of not higher than 180° C.

[24] The process as stated in [23], wherein the polymer having a polar group is a polyimide based polymer having an imidization ratio of not more than 45%.

[25] The process as stated in [22], wherein the substrate having a polar surface is a cycloolefin based resin substrate having been subjected to a plasma treatment.

[26] An optical compensation element having the homeotropically aligned liquid crystal film of any one of [1] to [21].

[27] An optical compensation element having the homeotropically aligned liquid crystal film produced by the process of any one of [22] to [25].

[28] An optical element having the homeotropically aligned liquid crystal film of any one of [1] to [21] and a polarizing plate.

[29] An optical element having the homeotropically aligned liquid crystal film produced by the process of any one of [22] to [25] and a polarizing plate.

[30] A liquid crystal display device having the optical compensation element of [26] or [27] inside or outside a liquid crystal cell.

[31] A liquid crystal display device having the optical element of [28] or [29] outside a liquid crystal cell.

According to the present invention, a liquid crystal film having uniform homeotropic alignment and excellent curability can be readily produced without forming an inert atmosphere in the curing stage of the polymerizable liquid crystal composition. Therefore, equipment to form an inert atmosphere becomes unnecessary, and the production process can be simplified.

DETAILED DESCRIPTION OF THE INVENTION

The homeotropically aligned liquid crystal film (sometimes referred to as a "liquid crystal film" simply hereinafter) according to the invention, the process for producing the liquid crystal film and uses of the liquid crystal film are described in detail hereinafter.

Description of Terms

First, terms used in the invention are described.

In the present specification, the polymerizable liquid crystal compounds represented by the formula (1-1), the formula (1-2) and the formula (1-3) are sometimes referred to as a "compound (1-1)", a "compound (1-2)" and a "compound (1-3)", respectively, and these compounds (1-1) to (1-3) are sometimes generically referred to as "compound(s) (1)" hereinafter. Likewise, the compounds represented by other formulas are also sometimes referred to simply and generically.

The term "tilt angle" means an angle formed by an alignment vector of a liquid crystal skeleton and a substrate plane. An alignment state where the tilt angles are close to zero uniformly from one interface to the other interface, particularly in the range of 0 to 5°, is referred to as "homogeneous alignment". The interface used herein is a substrate interface having an alignment layer or a free interface. An alignment state where the tilt angles are constant in the range of 5 to 85° from one interface to the other interface or an alignment state where the tilt angles continuously vary in the range of 0 to 90° from one interface to the other interface is referred to as "tilt alignment". An alignment state where the tilt angles are in the range of 85 to 90° uniformly from one interface to the other interface is referred to as "homeotropic alignment".

The meaning of the term "liquid crystalline" is not restricted to "having liquid crystal phase" only, and if a compound has characteristics that a mixture of the compound and another liquid crystal compound is employable as a component of a liquid crystal composition even if the compound itself has no liquid crystal phase, such characteristics are included in the meaning of "liquid crystalline".

The term "arbitrary" means not only arbitrary with regard to the position but also arbitrary with regard to the number. However, the meaning thereof does not include a case where the number is 0. For example, the expression "arbitrary —$CH_2$— in an alkyl may be replaced with —O— or —CH═CH—" indicates that plural —$CH_2$— may be replaced with different groups. More specifically, examples of groups wherein arbitrary —$CH_2$— in $C_4H_9$— is replaced with —O— or —CH═CH— include $C_3H_7O$—, $CH_3$—O—$(CH_2)_2$—, $CH_3$—O—$CH_2$—O—, $H_2C$═CH—$(CH_2)_3$—, $CH_3$—CH═CH—$(CH_2)_2$— and $CH_3$—CH═CH—$CH_2$—O—. Taking stability of compounds into consideration, it is undesirable in the present invention that continuous two —$CH_2$— are each replaced with —O— to form —O—O—.

When "alkyl" is described, it means alkyl including both of straight-chain alkyl and branched alkyl unless otherwise noted. For example, butyl may be any of n-butyl, 2-methylpropyl and 1,1-dimethylethyl. When "alkenyl" is described, it means alkenyl including both of straight-chain alkenyl and branched alkenyl. The same shall apply to "alkylene" and "alkenylene". Further, "cycloalkyl" and "cycloalkenyl" include not only usual cyclic group but also cyclic group of crosslinked structure.

Homeotropically Aligned Liquid Crystal Film

The liquid crystal film of the invention is obtained by applying a polymerizable liquid crystal composition containing at least one compound selected from the group consisting of polymerizable liquid crystal compounds (1-1) to (1-3) onto a substrate having a polar surface and polymerizing the composition.

[Polymerizable Liquid Crystal Composition]

The compounds which are components of the polymerizable liquid crystal composition for use in the invention are described.

The compound (1) has a liquid crystal skeleton and has one polymerizable group. The polar group (—CN group, —OCF$_3$ group) of the compound that is present at one end tends to have a mutual interaction particularly with the substrate having a polar surface and promotes homeotropic alignment.

The compound (1-1) is easily produced and is available at low cost. The compound (1-2) and the compound (1-3) have excellent liquid crystalline characteristics.

From the viewpoint of curing rate, it is preferable to use, in addition to the compound (1), the compound (2) having polymerizable groups at both ends in the polymerizable liquid crystal composition. It is also preferable to use a compound having an oxiranyl (epoxy) group and a compound having an oxetanyl (oxetane) group in combination. The compound (2) has a liquid crystal skeleton and two polymerizable groups. A polymer obtained from this compound can have a three-dimensional structure, so that this compound provides a polymer that is more rigid than a polymer obtained by a compound having one polymerizable group. The compound (2) tends to be homogeneously aligned though it depends upon the conditions such as a substrate and additives.

The constitution of the polymerizable liquid crystal composition for use in the invention is described. The composition contains at least one compound (1). The composition may contain plural compounds (1) and (2). The mixing ratios of the compound (1) and the compound (2) in the polymerizable liquid crystal composition are as follows with the proviso that the total amount of the compounds (1) and (2) is 100% by weight. The ratio of the compound (1) is in the range of preferably 3 to 70% by weight, more preferably 5 to 50% by weight, still more preferably 5 to 35% by weight. The ratio of the compound (2) is in the range of preferably 30 to 97% by weight, more preferably 50 to 95% by weight, still more preferably 65 to 95% by weight.

When the content of the compound (1) is in the above range, a uniform homeotropically aligned liquid crystal film can be obtained. The compound (1-1), the compound (1-2), the compound (1-3), the compound (2-1) and the compound (2-2) may be used singly or may be used in combination of two or more kinds. From the viewpoints of curing rate and mechanical properties, the following combinations are preferably used.

(a) Combination of compound (1-1) and compound (2-1)
(b) Combination of compound (1-1), compound (1-2) and compound (2-1)
(c) Combination of compound (1-1), compound (1-3) and compound (2-1)
(d) Combination of compound (1-2) and compound (2-2)
(e) Combination of compound (1-3) and compound (2-2)

The compound (1) and the compound (2) can be synthesized by properly combining publicly known techniques in the organic synthetic chemistry. A process for introducing desired end group, ring, bond group or the like into a starting material or a process for producing a compound into which desired end group, ring, bond group or the like has been introduced is described in, for example, Organic Syntheses (John Wiley & Sons, Inc.), Organic Reactions (John Wiley & Sons, Inc.), Comprehensive Organic Syntheses (Pergamon Press), or New Experimental Chemistry (Maruzen Co., Ltd.). In more detail, such synthetic processes are described in, for example, WO97/04349, Japanese Patent Laid-Open Publication No. 117564/2006, Japanese Patent Laid-Open Publication No. 45195/2006, National Publication of International Patent No. 513107/2003, Japanese Patent Laid-Open Publication No. 320317/2005, Japanese Patent Laid-Open Publication No. 241116/2006, Japanese Patent Laid-Open Publication No. 231638/2004, Japanese Patent Laid-Open Publication No. 182702/2004, Japanese Patent Laid-Open Publication No. 60373/2005 and Japanese Patent Laid-Open Publication No. 225607/2006.

Next, examples of the constituent compounds are described. From this paragraph downward, Me in the chemical formulas means methyl, and Et means ethyl.

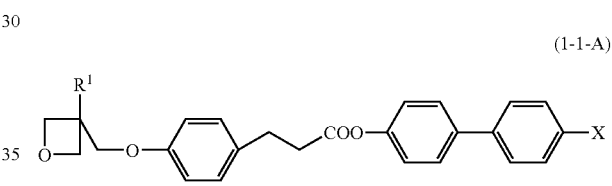

(1-1-A)

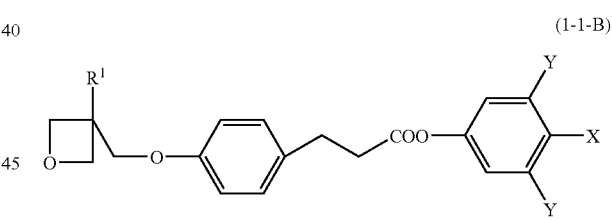

(1-1-B)

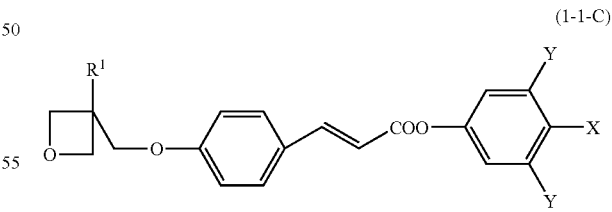

(1-1-C)

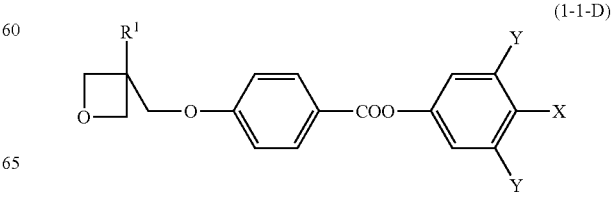

(1-1-D)

In the formula (1-1-A) to the formula (1-1-D), $R^1$ is methyl or ethyl, Y is hydrogen or fluorine, and X is —CN or —OCF$_3$.
In the formula (1-2-A) and the formula (1-2-B), Y is hydrogen or fluorine, and a is an integer of 1 to 10.
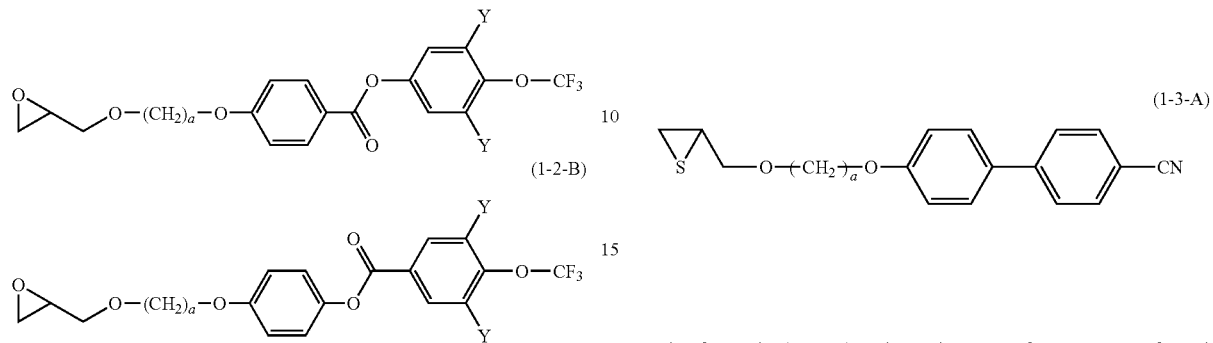
(1-2-A)
(1-2-B)
(1-3-A)
In the formula (1-3-A), a is an integer of 1 to 10. Preferred compounds (2-1) are as follows.
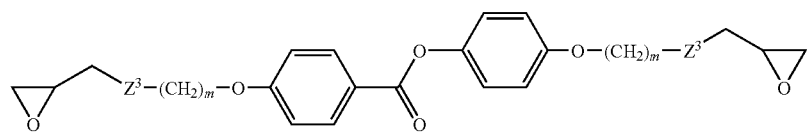
(2-1-A)
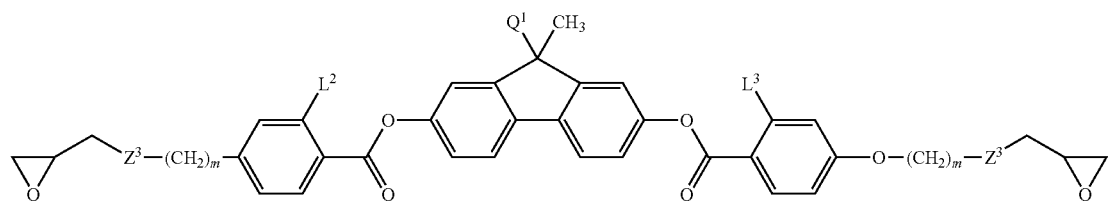
(2-1-B)
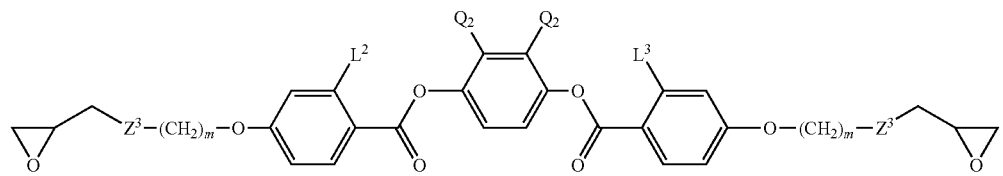
(2-1-C)
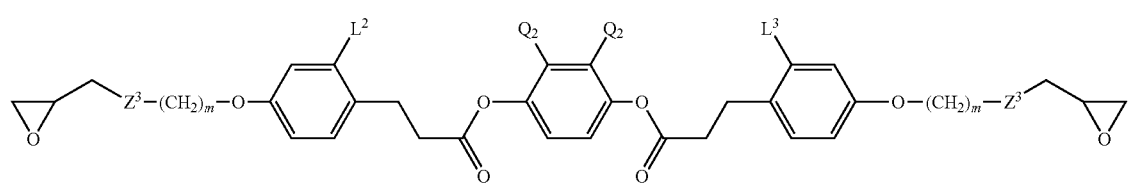
(2-1-D)
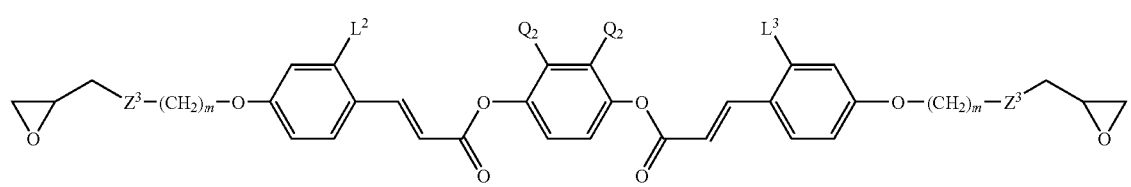
(2-1-E)

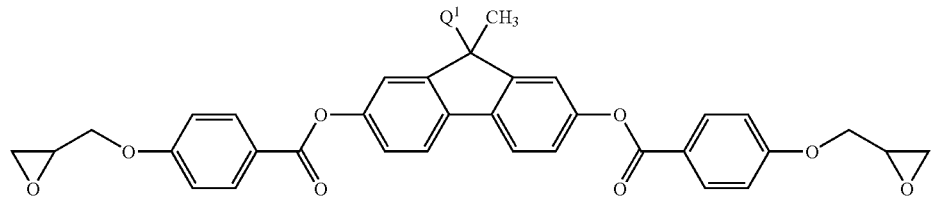
(2-1-F)
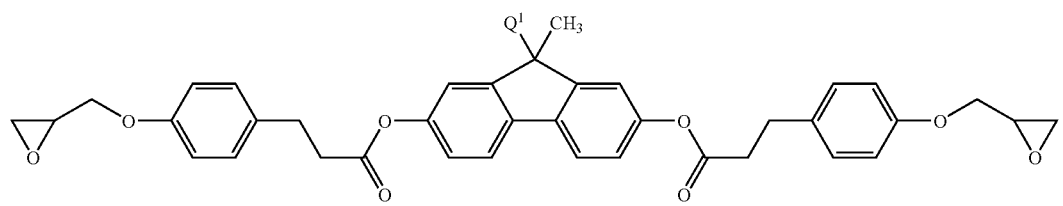
(2-1-G)
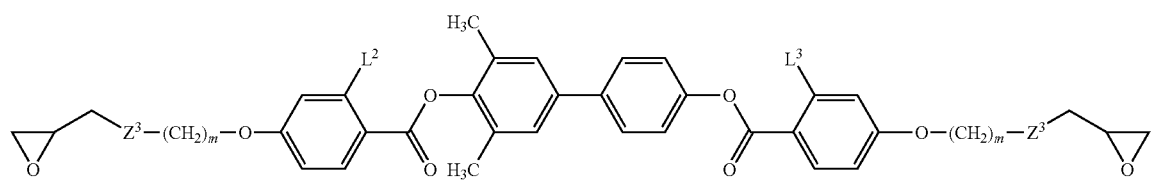
(2-1-H)
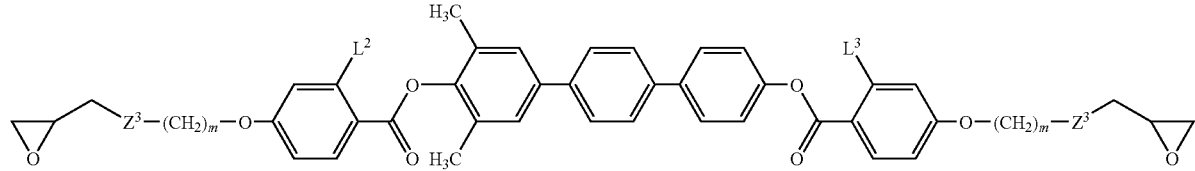
(2-1-I)
In the formula (2-1-A) to the formula (2-1-I), $Z^3$ is a single bond or —O—; $L^2$ and $L^3$ are each independently hydrogen or fluorine; $Q^1$ is hydrogen or methyl; each $Q^2$ is independently hydrogen, methyl or trifluoromethyl; and m is an integer of 0 to 10, and when m is 0, $Z^3$ is a single bond.
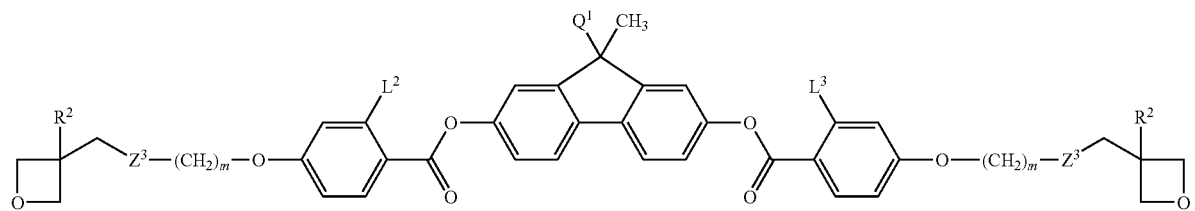
(2-2-A)
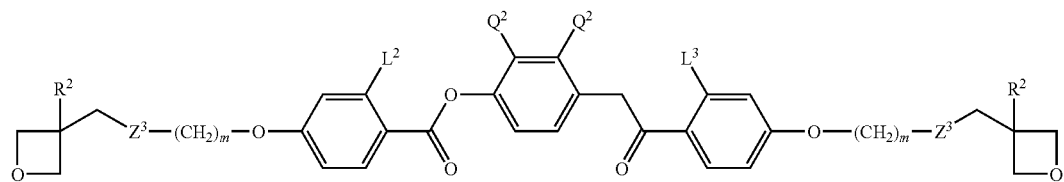
(2-2-B)

-continued
(2-2-C)
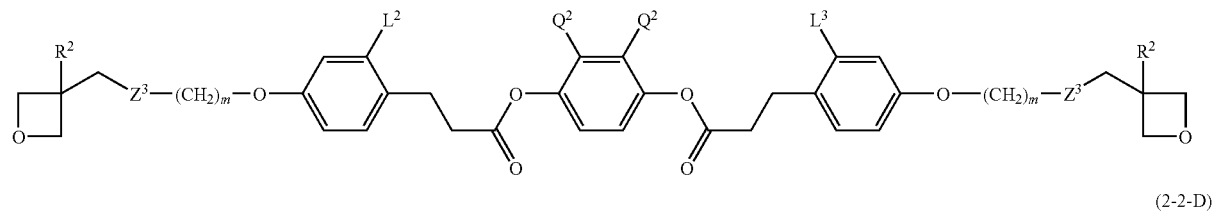
(2-2-D)
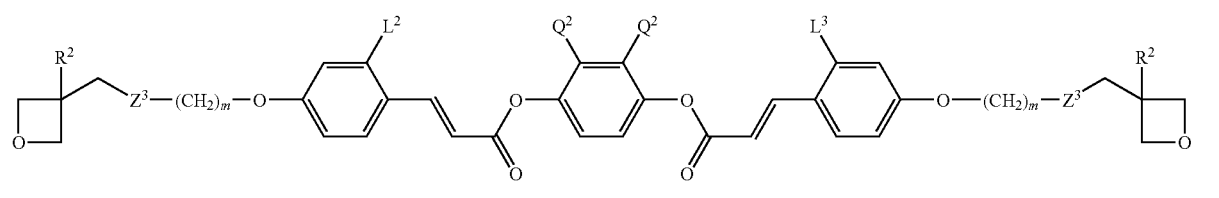
(2-2-E)
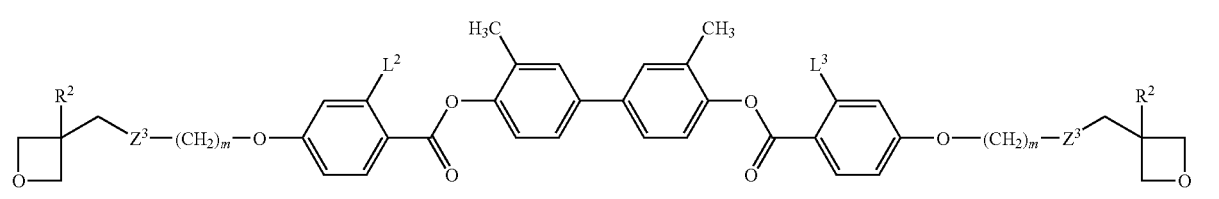
(2-2-F)
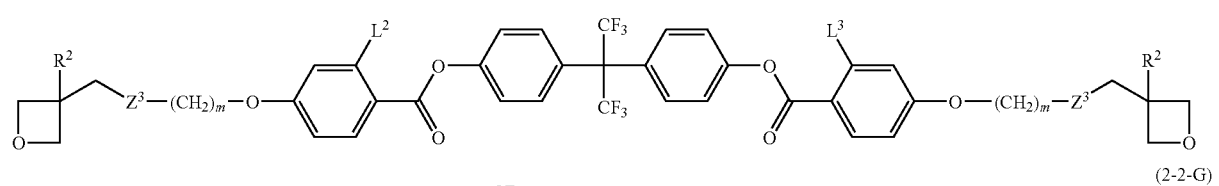
(2-2-G)
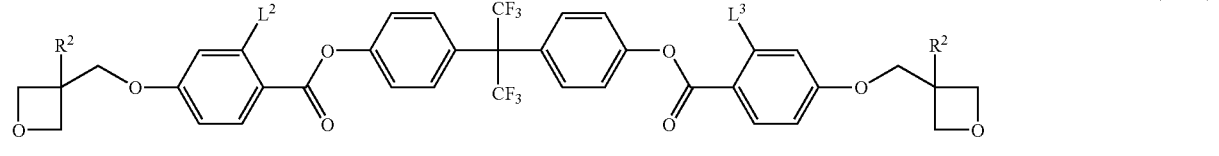
(2-2-H)
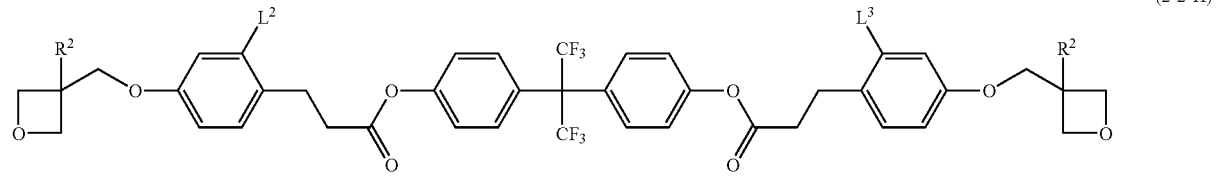
(2-2-I)
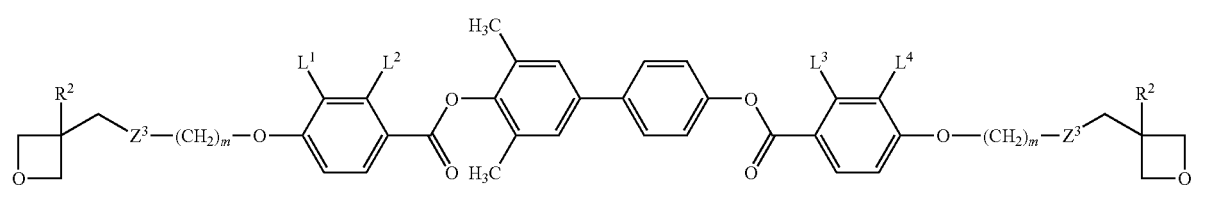
(2-2-J)
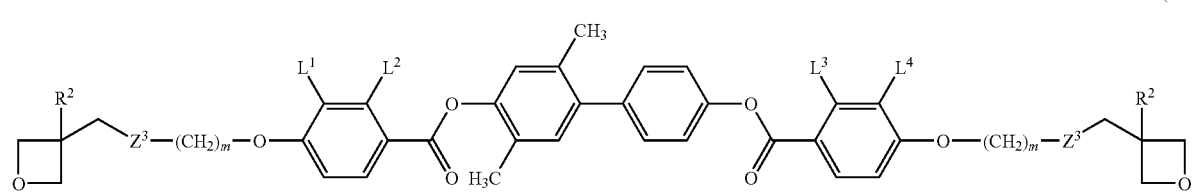

-continued

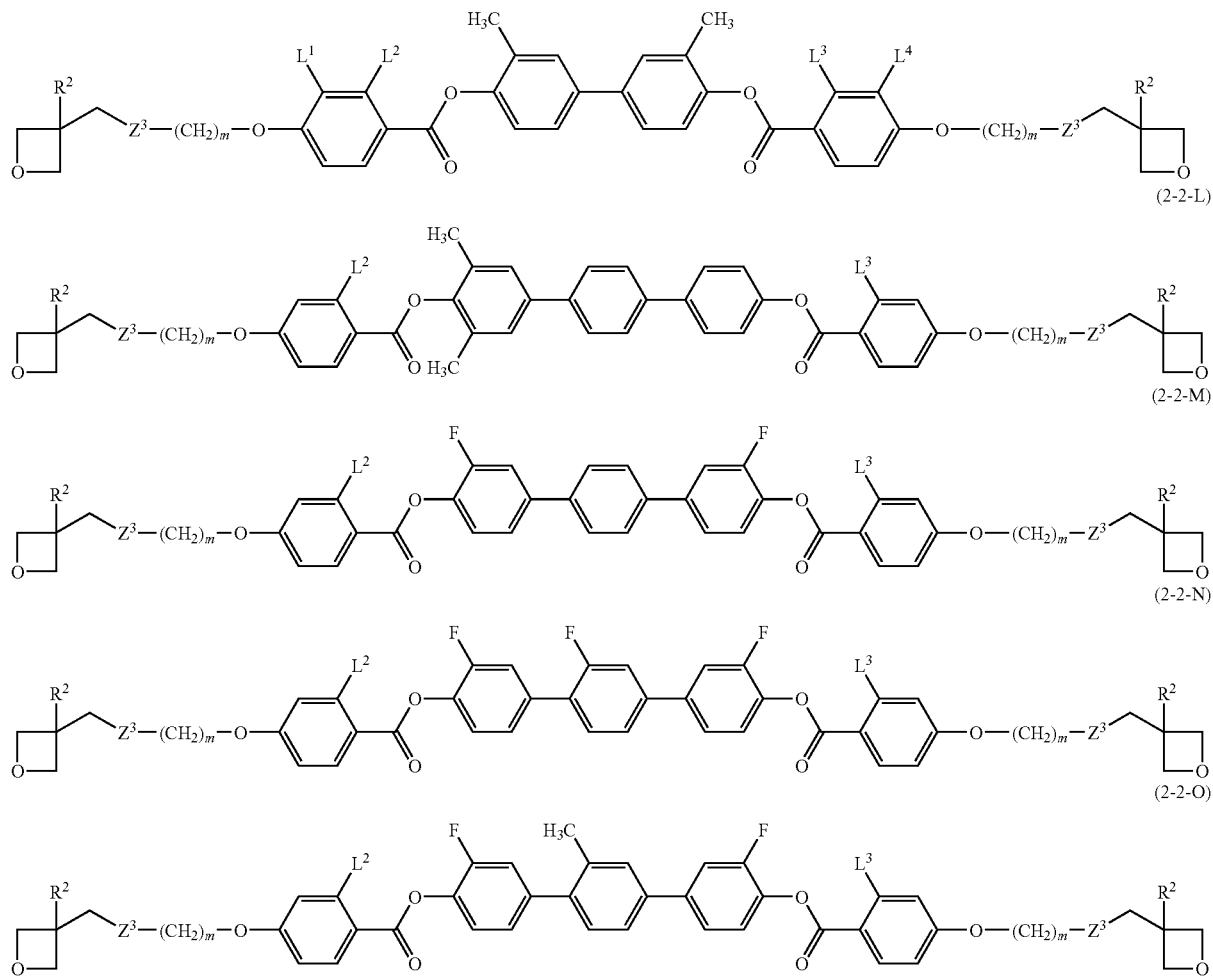

In the formula (2-2-A) to the formula (2-2-O), $R^2$ is methyl or ethyl; $Z^3$ is a single bond or —O—; $L^1$ to $L^4$ are each independently hydrogen or fluorine; $Q^1$ is hydrogen or methyl; each $Q^2$ is independently hydrogen, methyl or trifluoromethyl; and m is an integer of 0 to 10, and when m is 0, $Z^3$ is a single bond.

Preferred examples of the compounds (1-1) are as follows. In the following formulas, $R^1$ is methyl or ethyl.

(1-1-1)

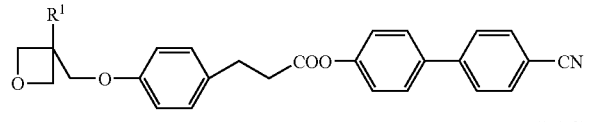

(1-1-2)

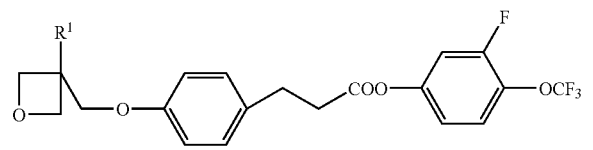

-continued (1-1-3)

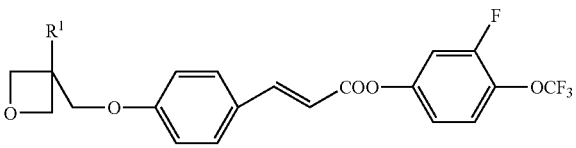

(1-1-4)

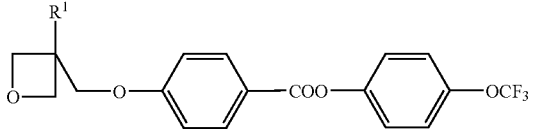

(1-1-5)

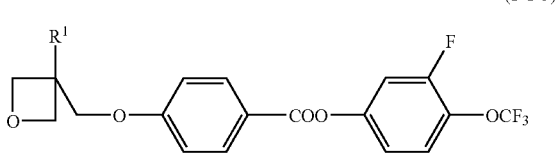

(1-1-6)
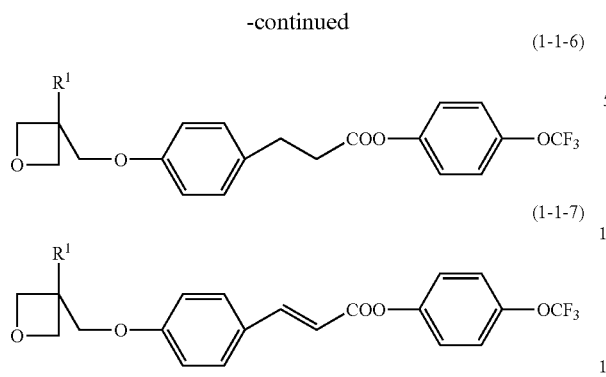
(1-1-7)
(1-2-2)
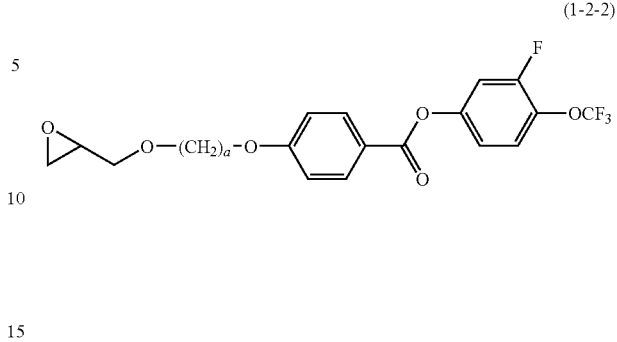
Preferred examples of the compounds (1-2) and the compounds (1-3) are as follows. In the following formulas, a is an integer of 4 to 8.
(1-2-1)
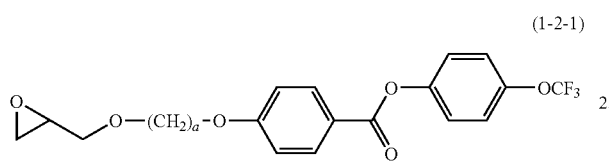
(1-3-1)
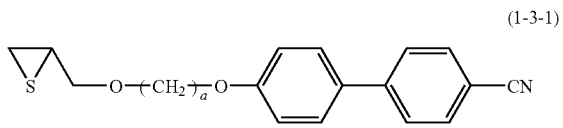
Of the above examples, preferable are the compound (1-1-1), the compound (1-1-5), and the compounds (1-2-1) and (1-3-1) wherein a is an integer of 4 to 6.
Examples of the compounds (2-1) and the compounds (2-2) are given below.
(2-1-1)
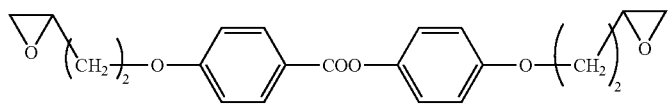
(2-1-2)
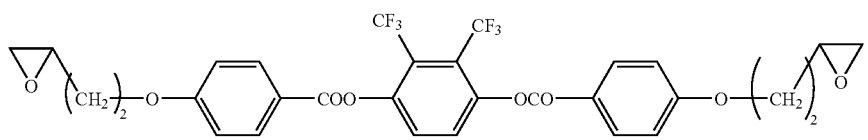
(2-1-3)
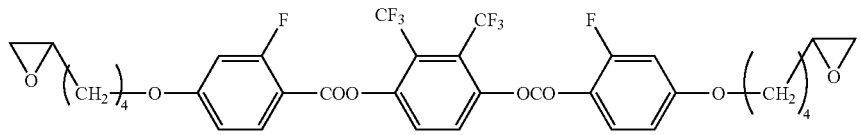
(2-1-4)
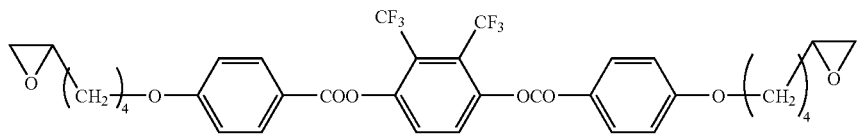
(2-1-5)
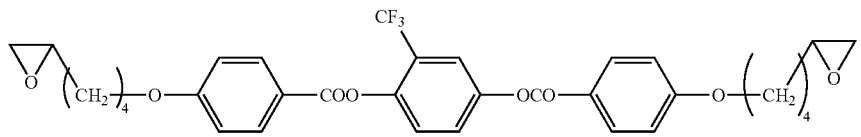
(2-1-6)
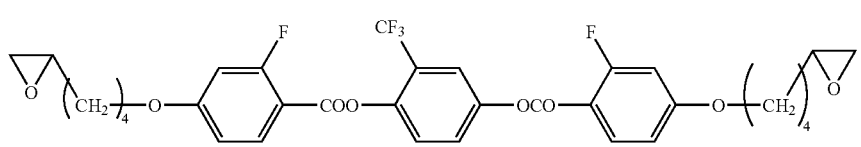

(2-1-7)
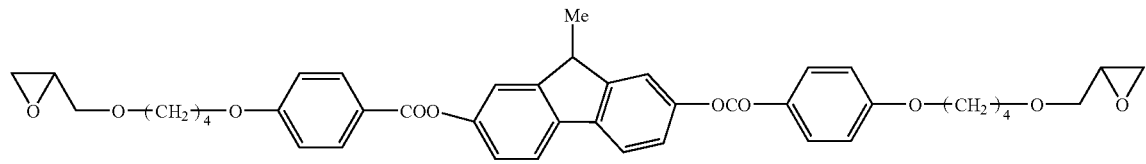
(2-1-8)
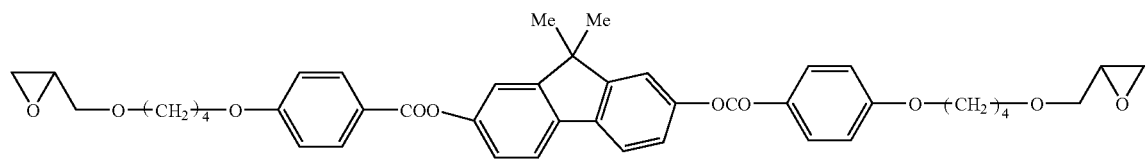
(2-1-9)
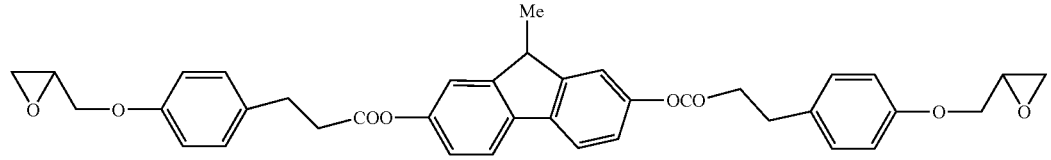
(2-1-10)
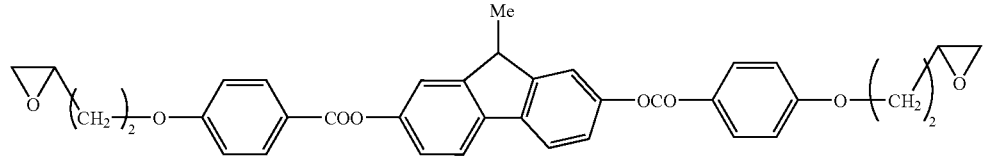
(2-1-11)
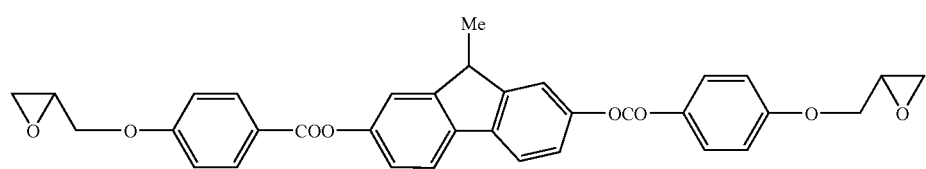
(2-1-12)
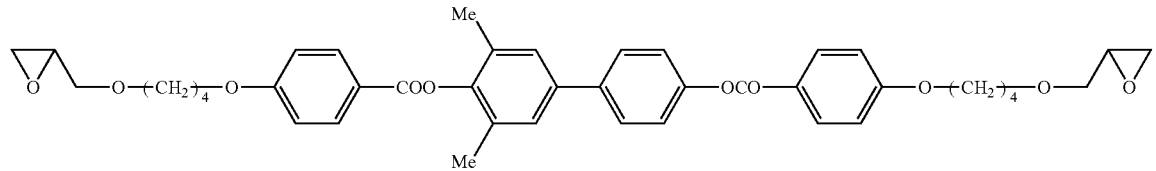
(2-1-13)
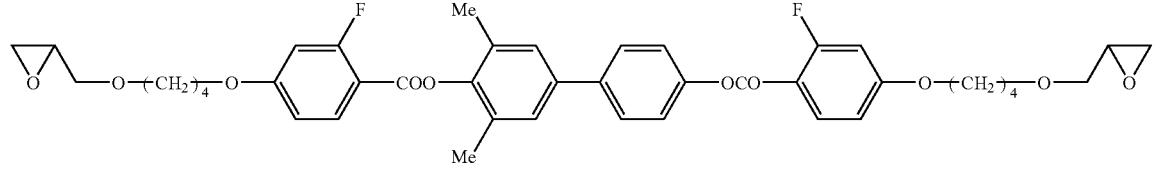
(2-1-14)
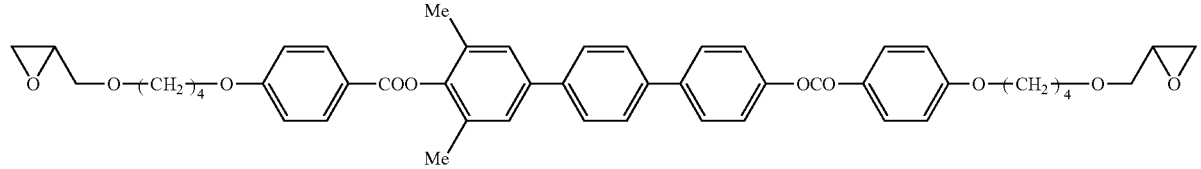
(2-2-1)
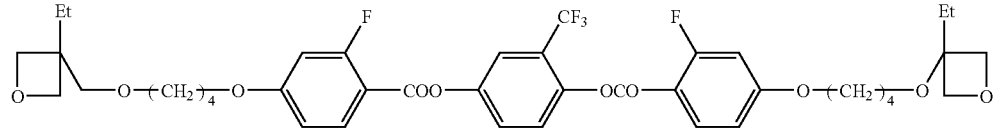

-continued
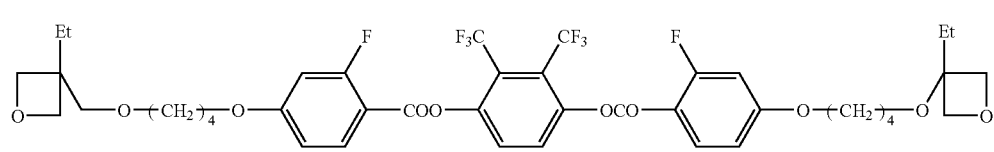
(2-2-2)
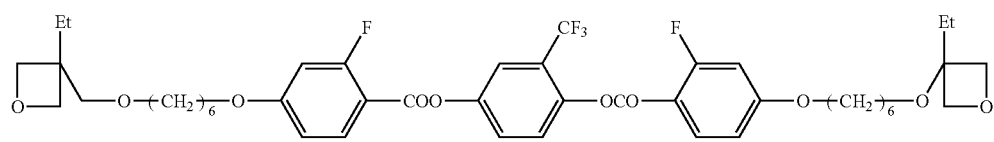
(2-2-3)
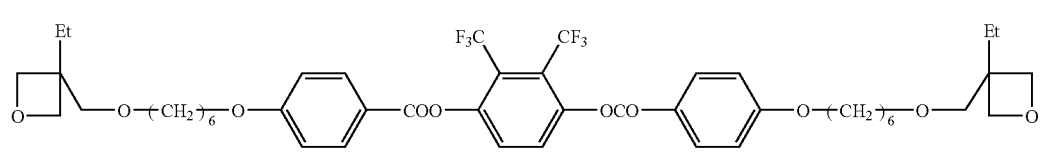
(2-2-4)
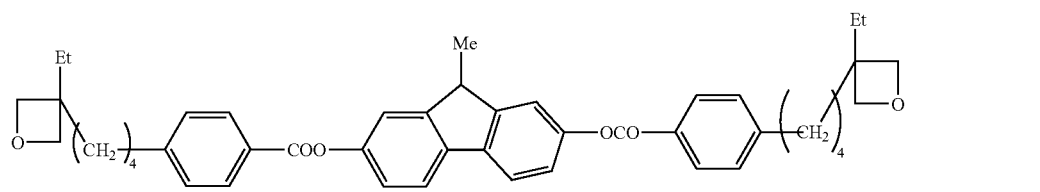
(2-2-5)
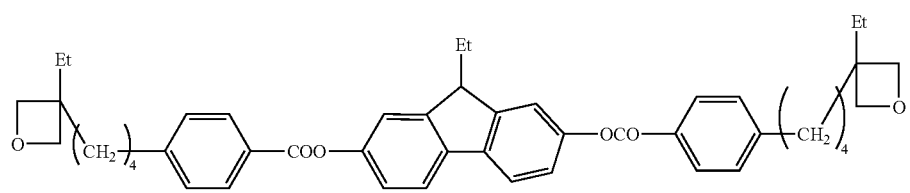
(2-2-6)
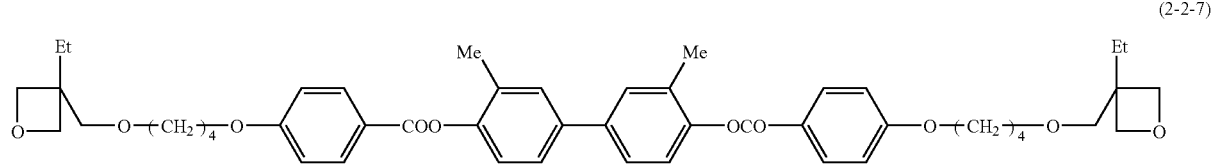
(2-2-7)
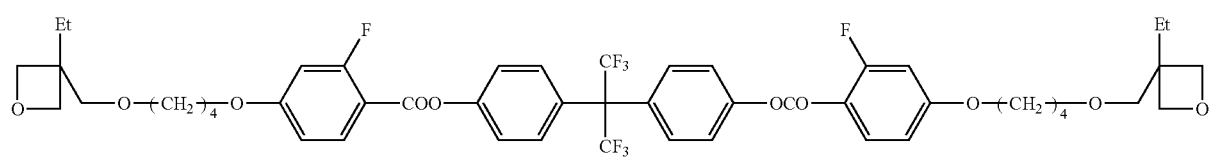
(2-2-8)
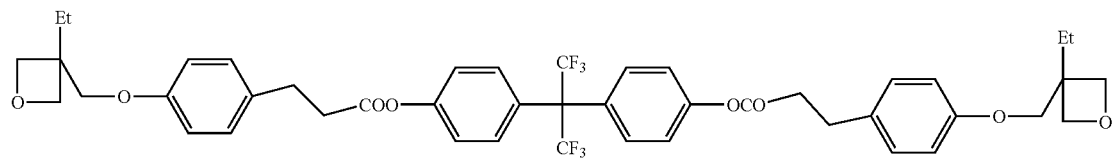
(2-2-9)
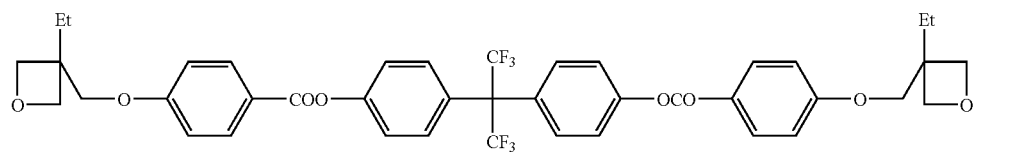
(2-2-10)

-continued
(2-2-11)
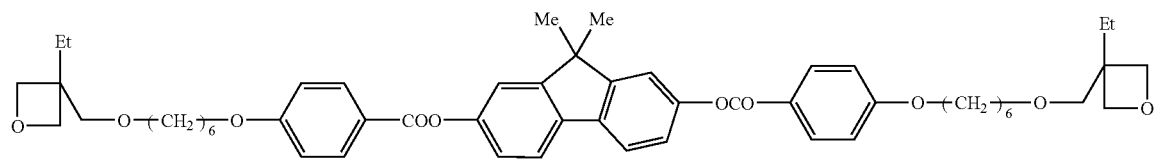
(2-2-12)
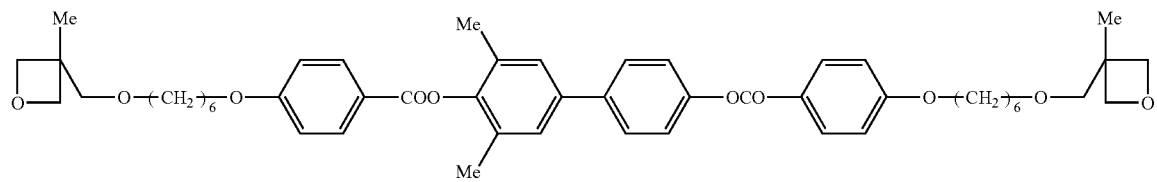
(2-2-13)
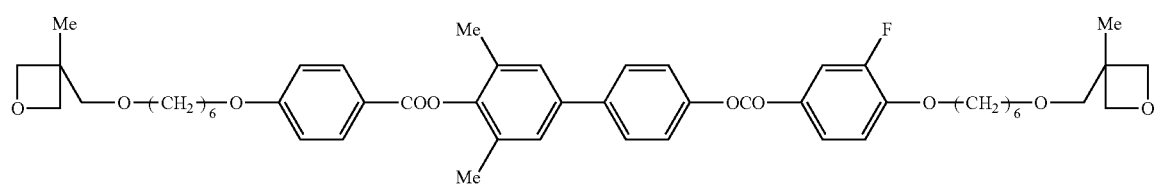
(2-2-14)
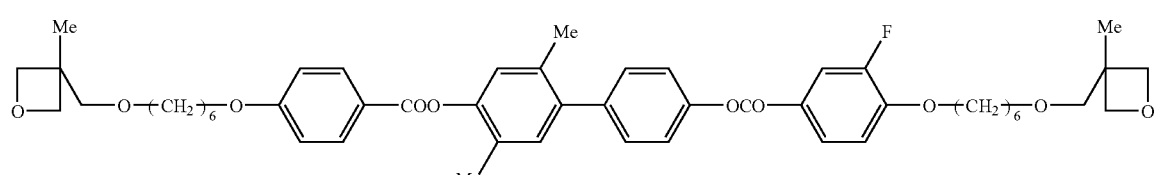
(2-2-15)
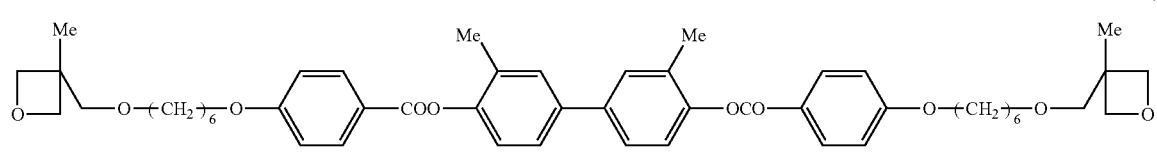
(2-2-16)
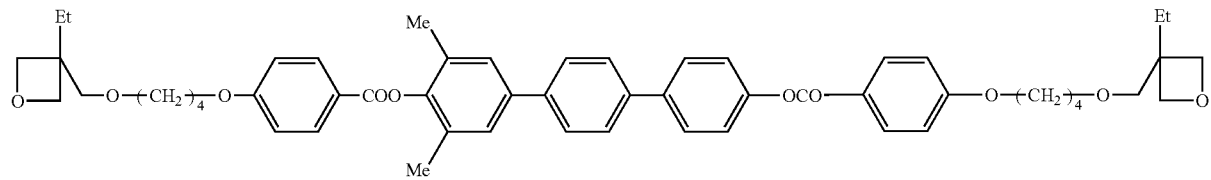
(2-2-17)
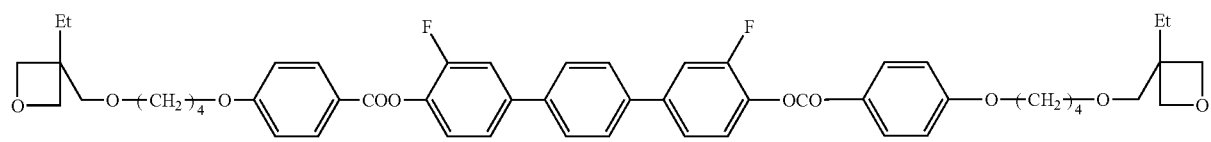
(2-2-18)
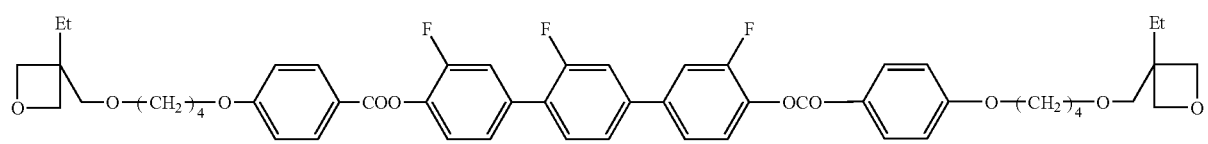

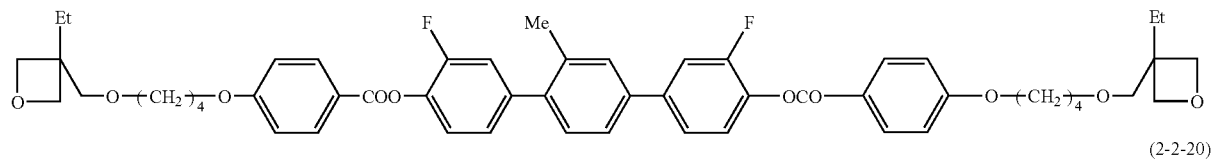

(2-2-19)

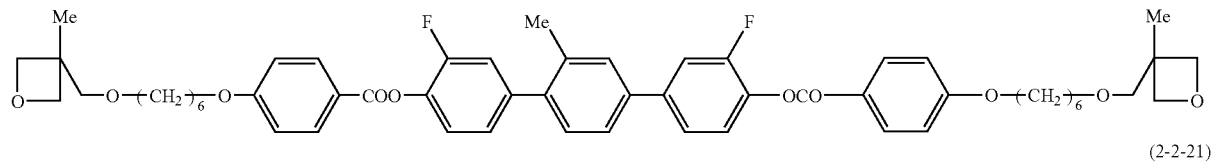

(2-2-20)

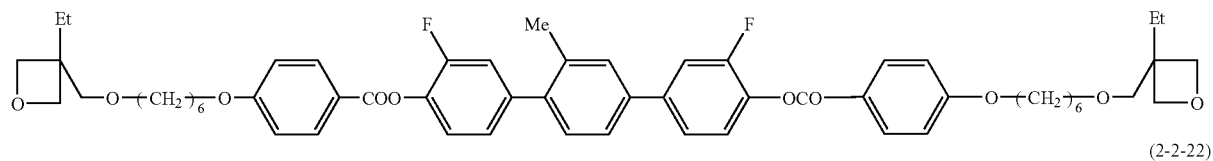

(2-2-21)

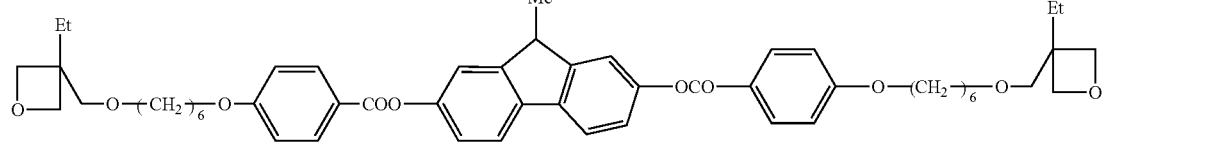

(2-2-22)

Of the above examples, preferable are the compound (2-1-1), the compound (2-1-3), the compound (2-1-4), the compound (2-1-7), the compound (2-1-8), the compound (2-1-9), the compound (2-2-2), the compound (2-2-4), the compound (2-2-5), the compound (2-2-6), the compound (2-2-8), the compound (2-2-9), the compound (2-2-10), the compound (2-2-11) and the compound (2-2-22).

The polymerizable liquid crystal composition for use in the invention may further contain a polymerizable liquid crystal compound other than the compound (1) and the compound (2). Such a polymerizable compound has only to have a structure by which homeotropic alignment is obtained, and is, for example, a compound (3) having a non-polymerizable and non-polar group at one end. The weight ratio of the compound (3) to the total amount of the compound (1) and the compound (2) is in the range of 0 to 0.25, preferably 0 to 0.15. When the compound (3) is used, the lower limit of a preferred weight ratio of the compound (3) is 0.05. Preferred examples of the compounds (3) are the following compounds (3-1) and (3-2). The compound (3) is different from the compound (1) in that the compound (3) does not have a non-polymerizable polar group at the end.

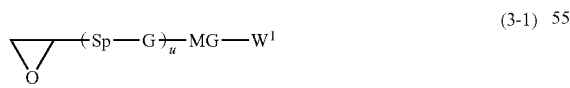

(3-1)

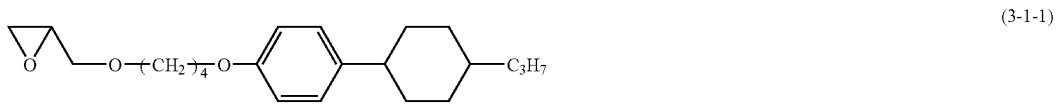

(3-2)

In the above formulas, Sp is alkylene of 1 to 20 carbon atoms, and when the number of carbon atoms is 2 or greater, —$CH_2$— in the alkylene may be replaced with —O—; G is a single bond, —O—, —COO— or —OCO—; u is 0 or 1; $W^1$ is hydrogen, fluorine, or alkyl or alkoxy of 1 to 25 carbon atoms; $R^2$ is methyl or ethyl; and MG is a mesogen skeleton represented by the following formula (3').

$$-(A^3-Z^8)_f-A^4-Z^9-A^5-\quad (3')$$

In the formula (3'), $A^3$ is 1,4-phenylene or 1,4-cyclohexylene; $A^4$ is 1,4-phenylene, 1,4-cyclohexylene or fluorene-2,7-diyl; $A^5$ is 1,4-phenylene or 3-fluoro-1,4-phenylene; $Z^8$ is a single bond or —COO—; $Z^9$ is a single bond or —OCO—; and f is 0 or 1.

Examples of the compounds (3) are given below. These compounds can be used within limits not detrimental to the effect of the present invention. A compound having an epoxy group described in National Publication of International Patent No. 507932/2000 or WO97/04349 may be employed.

(3-1-1)

-continued (3-1-2)
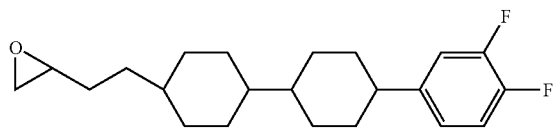

(3-1-3)
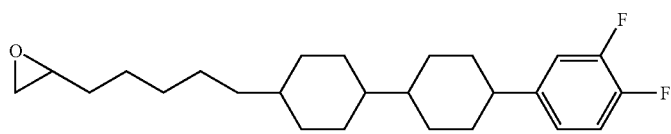

(3-1-4)
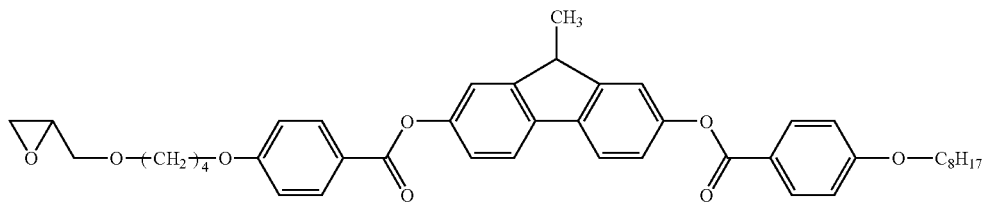

(3-2-1)
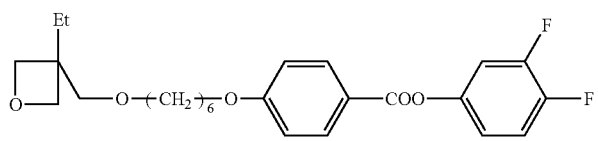

(3-2-2)
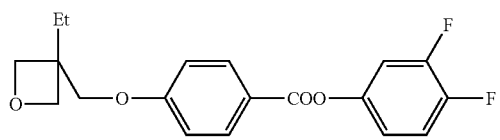

(3-2-3)
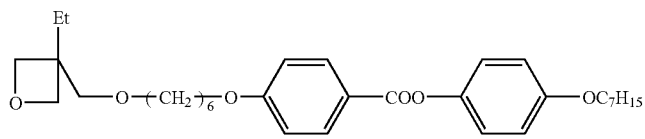

(3-2-4)
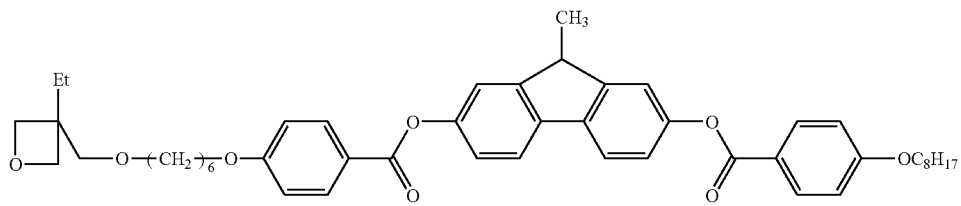

Of the compounds (3), preferable are the compound (3-1-1), the compound (3-1-4), the compound (3-2-1), the compound (3-2-2), the compound (3-2-3) and the compound (3-2-4).

To the polymerizable liquid crystal composition, a polymerizable compound (also referred to as a "compound (4)" hereinafter) other than the compounds (1) to (3) may be added within limits not detrimental to the effect of the present invention. The compound (4) may be a compound having no liquid crystalline characteristics. The weight ratio of the compound (4) to the total amount of the compound (1) and the compound (2) is in the range of 0 to 0.20, preferably 0 to 0.10, though it varies depending upon the structures of the polymerizable liquid crystal compounds (1) to (3), compositional ratios thereof, etc. When the compound (4) is used, the lower limit of a preferred weight ratio of the compound (4) is 0.05. When the ratio of the compound (4) added is in this range, liquid crystalline characteristics of the composition can be maintained, and phase separation of the liquid crystal phase hardly takes place.

The compound (4) is, for example, an epoxy resin. Specific examples of the epoxy resins include bisphenol A type epoxy resin, bisphenol F type epoxy resin, bisphenol S type epoxy resin, novolak type epoxy resin, polycarboxylic acid polyglycidyl ester, polyol polyglycidyl ether, fatty acid based epoxy resin, alicyclic epoxy resin, amine epoxy resin, triphenolmethane type epoxy resin, dihydroxybenzene type epoxy resin, and the following bisphenol fluorene diglycidyl ether (sold by Osaka Gas Chemicals Co., Ltd., BPF-G, BPEF-G, BCF-G).

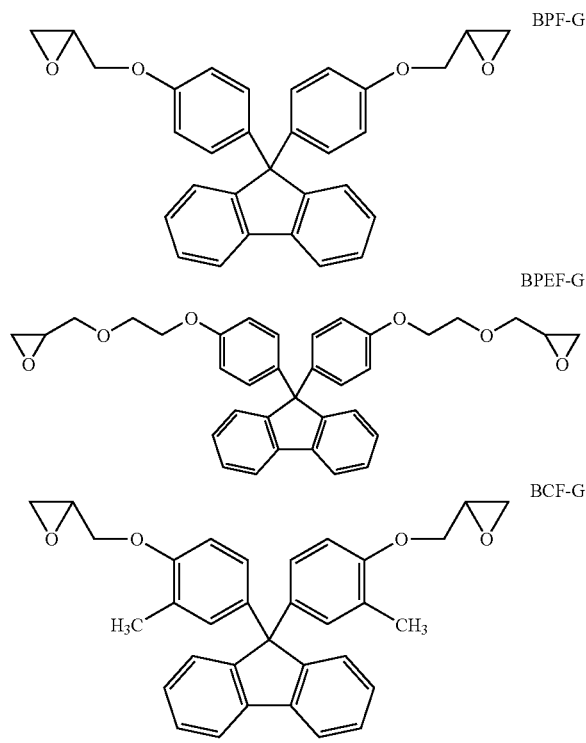

To the polymerizable liquid crystal composition, a cationic photopolymerization initiator is added when needed, and the composition is irradiated with light in the atmosphere to polymerize the polymerizable compounds, whereby a polymer can be obtained. In the light irradiation, heating may be carried out in a temperature range in which the liquid crystal phase is maintained. The cationic photopolymerization initiator is, for example, diaryliodonium salt (abbreviated to "DAS" hereinafter) or triarylsulfonium salt (abbreviated to "TAS" hereinafter). In the case where cationic photopolymerization is carried out, a preferred polymerizable group in the present invention is an organic group having oxiranyl (epoxy), oxetanyl (oxetane) or thiirane (episulfide).

Examples of the DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium p-toluenesulfonate, 4-methoxyphenylphenyliodonium-diphenyliodonium tetra(pentafluorophenyl)borate, bis(4-tert-butylphenyl) iodoniumdiphenyliodonium tetrafluoroborate, bis(4-tert-butylphenyl)iodoniumdiphenyliodonium hexafluoroarsenate, bis(4-tert-butylphenyl)iodoniumdiphenyliodonium trifluoromethanesulfonate, bis(4-tert-butylphenyl)iodonium trifluoroacetate, bis(4-tert-butylphenyl)iodonium -toluenesulfonate and bis(4-tert-butylphenyl)iodoniumdiphenyliodonium tetra(pentafluorophenyl)borate.

Sensitivity of the DAS can be enhanced by adding a photosensitizer, such as thioxanthone, phenothiazine, chlorothioxanthone, xanthone, anthracene, diphenylanthracene or rubrene, to the DAS.

Examples of the TAS include triphenylsulfonium tetrafluoroborate, triphenylsulfonium hexafluorophosphonte, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium p-toluenesulfonate, 4-methoxyphenyldiphenylsulfoniumtriphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium p-toluenesulfonate and 4-phenylthiophenyldiphenylsulfonium tetra(pentafluorophenyl)borate.

As commercially available products of the cationic photopolymerization initiators, there can be mentioned, for example, "Cyracure UVI-6990", "Cyracure UVI-6974" and "Cyracure UVI-6992" (available from UCC), "Adeca Optomer SP-150, SP-152, SP-170, SP-172" (available from Asahi Electro-Chemical Co., Ltd.), "PHOTOINITIATOR 2074" (available from Rhodia Japan Co., Ltd.), "Irgacure 250" (available from Ciba Specialty Chemicals, Inc.), "UV-9380C" (available from GE Silicones), and "DTS-102" (available from Midori Kagaku Co., Ltd.).

To the polymerizable liquid crystal composition, a thermal polymerization initiator is added when needed, and the composition is heated to polymerize the polymerizable compounds, whereby a polymer can be obtained. Examples of the thermal polymerization initiators include benzylsulfonium salts, benzylammonium salts, benzylpyridinium salts, benzylphosphonium salts, hydrazinium salts, carboxylic acid esters, sulfonic acid esters, amineimides, antimony pentachloride-acetyl chloride complex, diaryliodonium salt-dibenzyloxy copper, and boron halide-tertiary amine adduct.

The polymerizable liquid crystal composition for use in the invention can also be subjected to hybrid polymerization using the cationic photopolymerization initiator or the thermal polymerization initiator and a usual photoradical polymerization initiator in combination. Examples of the photoradical polymerization initiators include "Dalocur 1173" (2-hydroxy-2-methyl-1-phenylpropan-1-one), "Irgacure 184" (1-hydroxycyclohexyl phenyl ketone), "Irgacure 651" (2,2-dimethoxy-1,2-diphenylethan-1-one), "Irgacure 500", "Irgacure 2959", "Irgacure 907", "Irgacure 369", "Irgacure 1300", "Irgacure 819", "Irgacure 1700", "Irgacure 1800", "Irgacure 1850", "Dalocur 4265" and "Irgacure 784" (all available from Ciba Specialty Chemicals, Inc.)

Examples of photoradical polymerization initiators other than the above-mentioned ones include p-methoxyphenyl-2,4-bis(trichloromethyl)triazine, 2-(p-butoxystyryl)-5-trichloromethyl-1,3,4-oxadiazole, 9-phenylacrydine, 9,10-benzophenazine, benzophenone/Michler's ketone mixture, hexaaryl biimidazole/mercaptobenzimidazole mixture, 1-(4-isopropylphenyl)-2-hydroxy-2-methylpropan-1-one, benzyl dimethyl ketal, 2-methyl-1-[4-(methylthio)phenyl]-2-morpholinopropan-1-one, 2,4-diethylxanthone/methyl p-dimethylaminobenzoate mixture and benzophenone/methyl triethanolamine mixture.

The polymerizable liquid crystal composition for use in the invention can also be polymerized by utilizing basic propagation reaction (K. Arimitsu, M. Miyamoto, K. Ichimura, Angew. Chem. Int. Ed, 2000, 39, 3425). The amount of the photopolymerization initiator added is in the range of 0.01 to 10 parts by weight, more preferably 0.01 to 5 parts by weight, based on the total amount 100 parts by weight of the polymerizable liquid crystal compounds.

To the polymerizable liquid crystal composition, a polymerization inhibitor (polymerization inhibiting agent) may be added in order to inhibit polymerization initiation reaction in the storage of the composition. As the polymerization inhibitor, a publicly known compound is employable, and examples thereof include 2,5-di(t-butyl)hydroxytoluene (BHT), hydroquinone, methyl blue, diphenylpicrylhydrazyl (DPPH), benzothiazine, 4-nitrosodimethylaniline (NIDI) and o-hydroxybenzophenone.

To the polymerizable liquid crystal composition, an oxygen inhibitor (peroxide decomposer) may be added in order to improve storage properties. A radical that occurs in the composition reacts with oxygen in the surrounding atmosphere to give a peroxide by way of peroxy radical, and undesirable reaction with the polymerizable compound is accelerated. For the purpose of inhibiting this, it is preferable to add an oxygen inhibitor. Examples of the oxygen inhibitors include phosphoric esters.

In the production of the liquid crystal film of the invention, the polymerizable liquid crystal composition may be used as it is. However, a thin film may be produced by adding a solvent to the composition to prepare a solution, then applying or molding the solution and then removing the solvent.

Examples of the solvents include benzene, toluene, heptane, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclohexanone, cyclopentanone, ethyl acetate, alkyl lactate (ethyl lactate or the like), ethylene glycol monomethyl ether acetate, propylene glycol monomethyl ether acetate, propylene glycol monoethyl ether acetate, chloroform, dichloromethane, carbon tetrachloride, dichloroethane, trichloroethylene, tetrachloroethylene, chlorobenzene, THF, 1,4-dioxane, bis(methoxyethyl)ether, γ-butyrolactone, tetramethylurea, trifluoroacetic acid, ethyl trifluoroacetate, hexafluoro-2-propanol, ethanol, 2-propanol, t-butyl alcohol, diacetone alcohol, glycerol, monoacetin, ethylene glycol, triethylene glycol, hexylene glycol, ethylene glycol monomethyl ether, ethyl cellosolve, butyl cellosolve, PGMEA, N-methyl-2-pyrrolidone (NMP), dimethyl sulfoxide, N,N-dimethylacetamide, N,N-dimethylacetamide dimethyl acetal and dimethylformamide. These solvents may be used singly or may be used by mixing two or more kinds.

The solvent has only to be used under the conditions where the substrate used in the invention is not attacked. For example, a polar solvent can be used in an amount of not less than 5% by weight, preferably 10 to 50% by weight, more preferably 10 to 30% by weight, based on the total weight of the solvents (total weight of polar solvent and low-polar solvent). Particularly when a norbornene resin is selected for the substrate, attack by a solvent can be avoided by the use of a polar solvent in an amount of not less than 30% by weight, preferably not less than 40% by weight, more preferably not less than 50% by weight, based on the total weight of the solvents (total weight of polar solvent and low-polar solvent).

Preferred examples of the polar solvents include ketones, such as acetone, methyl ethyl ketone, methyl isobutyl ketone, cyclohexanone, cyclopentanone and methyl propyl ketone; acetates, such as ethylene glycol monomethyl ether acetate, propylene glycol monomethyl ether acetate, propylene glycol monoethyl ether acetate and methyl actoacetate; ethers, such as ethylene glycol dimethyl ether, diethylene glycol dimethyl ether, 1,4-dioxane and THF; cellosolves, such as ethyl cellosolve, butyl cellosolve and PGMEA; esters, such as ethyl acetate, butyl acetate, alkyl lactate (methyl lactate, ethyl lactate, isopropyl lactate, n-propyl lactate, butyl lactate, ethylhexyl lactate), and ethyl trifluoroacetate; alcohols, such as hexafluoro-2-propanol, ethanol, 2-propanol, t-butyl alcohol and diacetone alcohol; γ-butyrolactone, and NMP. These solvents may be used singly or may be used by mixing two or more kinds.

Preferred examples of the low-polar solvents include benzene, toluene, heptane, xylene, mesitylene, n-butylbenzene, diethylbenzene, tetralin, methoxybenzene, 1,2-dimethoxybenzene, chloroform, dichloromethane, carbon tetrachloride, dichloroethane, trichloroethylene, tetrachloroethylene, chlorobenzene, bis(methoxyethyl)ether, tetramethylurea, trifluoroacetic acid, glycerol, monoacetin, ethylene glycol, triethylene glycol, hexylene glycol and ethylene glycol monomethyl ether. These solvents may be used singly or may be used by mixing two or more kinds.

To the polymerizable liquid crystal composition, a surface active agent may be added within limits not detrimental to the effect of the present invention and the curability of the composition, in order to facilitate application of the composition or in order to control alignment of liquid crystal phase.

Examples of the surface active agents include imidazoline, quaternary ammonium salt, alkylamine oxide, polyamine derivative, polyoxyethylene-polyoxypropylene condensate, polyethylene glycol and its ester, sodium lauryl sulfate, ammonium lauryl sulfate, laurylsulfuric acid amines, alkyl-substituted aromatic sulfonate, alkyl phosphate, aliphatic or aromatic sulfonic acid formalin condensate, laurylamidopropyl betaine, laurylaminoacetic acid betaine, polyethylene glycol fatty acid esters, polyoxyethylene alkylamine, perfluoroalkyl sulfonate, perfluoroalkyl carboxylate, perfluoroalkyl ethylene oxide adduct, perfluoroalkyl trimethylammonium salt, oligomer having perfluoroalkyl group and hydrophilic group, oligomer having perfluoroalkyl group and lipophilic group, and urethane having perfluoroalkyl group.

The amount of the surface active agent added is in the range of 0.002 to 5 parts by weight, preferably 0.01 to 1 part by weight, based on 100 parts by weight of the polymerizable liquid crystal compounds in the polymerizable liquid crystal composition, though it varies depending upon the type of the surface active agent, compositional ratio of the polymerizable liquid crystal composition, etc.

[Substrate]

As the substrate to be coated with the polymerizable liquid crystal composition, a substrate having a polar surface is employed. By the use of such a substrate having a polar surface, a state of uniform and stable homeotropic alignment can be formed. The material of the substrate is glass or a plastic resin.

Examples of the plastic resins include polyimide, polyamideimide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyallylate, acrylic resin, polyvinyl alcohol, polypropylene, cellulose, triacetyl cellulose (TAC), partial saponification product of triacetyl cellulose, epoxy resin, phenolic resin and cycloolefin based resin.

Although the cycloolefin based resin is not specifically restricted, there can be mentioned, for example, a norbornene based resin and a dicyclopentadiene based resin. Of these, a resin having no unsaturated bond or a resin wherein an unsaturated bond has been hydrogenated is preferably employed, and examples of such resins include a hydrogenation product of a ring-opened (co)polymer of one or more norbornene based monomers, an addition (co)polymer of one or more norbornene based monomers, an addition copolymer of a norbornene based monomer and an olefin based monomer (ethylene, α-olefin or the like), an addition copolymer of a norbornene based monomer and a cycloolefin based monomer (cyclopentene, cyclooctene, 5,6-dihydrodicyclopentadiene or the like), and modification products thereof. More specifically, there can be mentioned "ZEONEX" and "ZEONOR" (available from Nippon Zeon Co., Ltd.), "ARTON" (available from JSR corporation), "TOPAS" (available from Ticona), "APEL" (available from Mitsui Chemicals, Inc.), "Escena" (available from Sekisui Chemical Co., Ltd.) and "OPTOREZ" (available from Hitachi Chemical Co., Ltd.).

In the case where a plastic film is used as the substrate, the film may be a monoaxially stretched film or a biaxially oriented film. Further, the film may be a single-layer film or a laminated film.

The substrate is subjected to surface treatment in order to impart polarity to the substrate surface. As the surface treatment, a film-forming treatment using a polymer having a polar group, a corona treatment or a plasma treatment is preferable, and any one of the film-forming treatment, the corona treatment and the plasma treatment may be carried out, or two or more of them may be carried out in combination. As the plasma treatment, a method described in Japanese Patent Laid-Open Publication No. 226616/2002 or Japanese Patent Laid-Open Publication No. 121648/2002 may be employed.

The polarity of the substrate surface after the plastic film is subjected to the surface treatment such as corona treatment or plasma treatment can be evaluated by measuring a contact angle with water, and the contact angle to obtain uniform and stable homeotropic alignment is not more than 80°, preferably 5° to 65°, more preferably 5° to 50°.

The polymer having a polar group that is used for the film-forming treatment is, for example, a polymer having a carboxyl group and/or an amino group in a molecular chain, and is preferably a polyimide based polymer or a water-soluble silsesquioxane derivative having an amino group.

<Polyimide Based Polymer>

The polyimide based polymer can be used in the form of a polyimide based varnish. The polyimide based varnish is a varnish composition wherein a polymer component, such as polyamic acid, polyamic acid amide, polyamic acid ester, soluble polyimide or polyamideimide, is dissolved in a solvent. By applying the varnish composition onto a substrate and then drying it to remove the solvent, a polymer film is formed. The polymer component to constitute the polymer film may be a copolymer such as a random copolymer or a block copolymer, and may be used singly or in combination of two or more kinds.

A preferred polyimide based polymer is a polymer having an amide bond, an imide bond, a carboxyl group that is an imidization reaction residue, a group obtained by amidating the carboxyl group or a group obtained by esterifying the carboxyl group. Preferred examples of such polymers include polyamic acid, polyamic acid amide and polyamic acid ester.

Of these, polyamic acid and polyamic acid amide are more preferable, and polyamic acid is particularly preferable.

As tetracarboxylic dianhydride and diamine that are used to obtain the polyamic acid, the polyamic acid amide or the polyamic acid ester, there can be mentioned, for example, compounds described on page 234 to page 243 of Japanese Patent Laid-Open Publication No. 23657/2006. These compounds may be used singly or in combination of two or more kinds.

Molecular weight of the polyamic acid, the polyamic acid amide, the polyamic acid ester, the soluble polyimide or the polyamideimide for use in the invention, concentration of the polymer component in the polyimide based varnish, solvent that is used together with the polymer component, other solvents used for the purpose of improving coating properties, various additives and method of applying the polyimide based varnish are desirably determined in accordance with the methods described on page 243 to page 244 of Japanese Patent Laid-Open Publication No. 23657/2006.

The polarity of the substrate surface after the film-forming treatment using the polyimide based polymer can be evaluated by measuring an imidization ratio. In order to promote homeotropic alignment, the dehydration-ring closure reaction (imidization reaction) ratio of the polyimide based varnish is preferably made as low as possible. The imidization ratio of the polyimide based polymer film is not more than 45%, preferably 0 to 35%, more preferably 0 to 20%. It is thought that when the imidization ratio is in the above range, the proportion of polar groups such as carboxyl group and amide bond in the polyimide based polymer film is increased to strengthen mutual interaction between the polymerizable liquid crystal having non-polymerizable polar group and the polyimide based polymer film, and as a result, homeotropic alignment of the polymerizable liquid crystal is readily obtained, though the reason is not clear.

In order to promote homeotropic alignment of the polymerizable liquid crystal, therefore, drying after the application of the varnish is preferably carried out at a relatively low temperature within a temperature range in which evaporation of the solvent is possible. More specifically, drying is desirably carried out at a temperature of not higher than 180° C., preferably 40° C. to 180° C., more preferably 50° C. to 150° C., still more preferably 70° C. to 120° C. As another means to suppress the imidization ratio low, a method of esterifying or amidating a part of carboxyl groups of the polyamic acid prior to the imidization reaction may be adopted. The polyamic acid amide or the polyamic acid ester is a polymer obtained by this method.

<Water-Soluble Silsesquioxane Derivative having Amino Group>

The water-soluble silsesquioxane derivative having an amino group can be obtained by a process described on page 203 to page 205 of Japanese Patent Laid-Open Publication No. 23656/2006.

For forming a polymer film composed of the water-soluble silsesquioxane derivative having an amino group on the substrate, the water-soluble silsesquioxane derivative having an amino group is preferably used as its aqueous solution. Although the concentration of the derivative is not specifically restricted, it is preferably in the range of 0.1 to 60% by weight. If the concentration of the silsesquioxane derivative is not more than 60% by weight, the viscosity becomes excellent, and when the aqueous solution is diluted with water in order to control film thickness, water can be readily mixed. In case of spinner method or printing method, the concentration is frequently set to usually not more than 40% by weight in order to maintain excellent film thickness. In case of other coating methods such as dipping method and ink jet method, it is possible to further lower the concentration. On the other hand, when the concentration of the silsesquioxane derivative is not less than 0.1% by weight, a polymer film having excellent film thickness tends to be obtained. In case of usual spinner method or printing method, the concentration of the silsesquioxane derivative having an amino group is not less than 0.1% by weight, preferably 1 to 40% by weight, but the solution may be used in a further lower concentration depending upon the method of applying the aqueous solution.

In the aqueous solution, a solvent capable of dissolving the silsesquioxane derivative component may be used in combination. Such a solvent can be properly selected from solvents which are usually used in the production process or uses of the silsesquioxane derivative component, according to the use purpose. This solvent is preferably water-soluble, and is selected from alcohol solvents, ketone solvents, non-proton polar solvents, etc.

Examples of the solvents include ethylene glycol dimethyl ether, diethylene glycol dimethyl ether, acetone, methyl ethyl ketone, methyl isobutyl ketone, cyclohexanone, cyclopentanone, ethyl acetate, ethylene glycol monomethyl ether acetate, propylene glycol monomethyl ether acetate, propylene glycol monoethyl ether acetate, THF, 1,4-dioxane, bis (methoxyethyl)ether, γ-butyrolactone, tetramethylurea, trifluoroacetic acid, ethyl trifluoroacetate, hexafluoro-2-propanol, t-butyl alcohol, diacetone alcohol, glycerol, monoacetin, ethylene glycol, triethylene glycol, hexylene glycol, ethylene glycol monomethyl ether, ethyl cellosolve, butyl cellosolve, PGMEA, 2-pyrrolidone, N-methyl-2-pyrrolidone, dimethyl sulfoxide, N,N-dimethylacetamide, N,N-dimethylacetamide dimethyl acetal and dimethylformamide.

As a method of applying the aqueous solution of the silsesquioxane derivative having an amino group, there can be adopted, for example, spinner method, printing method, dipping method, dropping method or ink jet method. As a heating method in the drying step, there can be adopted, for example, heating in an oven or an infrared oven or heating on a hot plate.

The drying after the application of the aqueous solution of the silsesquioxane derivative having an amino group is preferably carried out at a temperature that is within a temperature range in which evaporation of the solvent is possible and that is not higher than the heat-resistant temperature of the substrate. Particularly when the substrate is a plastic substrate, the drying temperature is in the range of 80 to 150° C., that is not higher than the glass transition temperature of the substrate used, preferably 90 to 120° C.

The polarity of the substrate surface after the film-forming treatment using the water-soluble silsesquioxane derivative having an amino group can be evaluated by measuring a contact angle with water, and the contact angle to obtain uniform and stable homeotropic alignment is not more than 80°, preferably 5° to 65°, more preferably 50 to 50°, as previously described.

<Rubbing Treatment>

After the substrate surface is treated so as to have polarity as described above, the surface may be subjected to physical/mechanical surface treatment such as rubbing treatment, prior to formation of a film of the polymerizable liquid crystal composition. In the formation of a homeotropically aligned liquid crystal film, surface treatment such as rubbing is not carried out in many cases, but in order to prevent alignment defects or the like, rubbing treatment may be carried out. For the rubbing treatment, an arbitrary method is adoptable, but usually adopted is a method wherein a rubbing cloth made of a material, such as rayon, cotton or polyamide, is wound round a metallic roll and the roll that is in contact with the substrate or the polymer film is moved with rotating the roll, or a method wherein the substrate is moved with keeping the roll fixed.

[Process for Producing Homeotropically Aligned Liquid Crystal Film]

Examples of methods for uniformly applying the polymerizable liquid crystal composition onto the substrate having a polar surface include spin coating, roll coating, curtain coating, flow coating, printing, microgravure coating, gravure coating, wire bar coating, dip coating, spray coating, meniscus coating and die coating.

In the case where a solution of the polymerizable liquid crystal composition is applied onto the substrate, the solvent is removed by drying after the application, whereby a coating film layer of the polymerizable liquid crystal composition having a uniform film thickness is formed. The conditions for removing the solvent are not specifically restricted, and drying has only to be carried out until most of the solvent is removed and the coating film layer loses fluidity. The solvent can be removed by utilizing, for example, air drying at room temperature, drying on a hot plate, drying in a drying oven, or blowing of warm air or hot air. Depending upon the types and the compositional ratio of the compounds used for the polymerization liquid crystal composition, nematic alignment of the polymerizable liquid crystal composition in the coating film is sometimes completed in the drying of the coating film. Therefore, the film having been subjected to the drying can be fed to the polymerization step without subjecting the film to the later-described heat treatment. In order to further uniformalize alignment of the liquid crystal molecules in the coating film, however, the film having been subjected to the drying is preferably subjected to heat treatment and then subjected to photopolymerization.

Preferred ranges of the temperature and the time of the heat treatment of the coating film, the wavelength of light used for light irradiation, the quantity of light emitted from the light source, etc. vary depending upon the types and the compositional ratio of the compounds used for the polymerizable liquid crystal composition, addition of a photopolymerization initiator or not, the quantity of a photopolymerization initiator added, etc. Therefore, the conditions described below regarding the temperature and the time for the heat treatment of the coating film, the wavelength of light used for light irradiation and the quantity of light released from the light source are those in rough ranges.

Heat treatment of the coating film is carried out at a temperature not lower than the liquid crystal phase transition point of the polymerizable liquid crystal composition. One example of the heat treatment method is a method of heating the film up to a temperature at which the polymerizable liquid crystal composition exhibits a nematic liquid crystal phase and thereby allowing the polymerizable liquid crystal composition in the film to form nematic alignment. The nematic alignment may be formed by changing the temperature of the film in a temperature range in which the polymerizable liquid crystal composition exhibits a nematic liquid crystal phase. This method is a method wherein the film is heated to a high temperature in the above temperature range to mostly complete nematic alignment in the film and then the temperature is lowered to establish more ordered alignment.

Even if any of the above heat treatment methods is adopted, the heat treatment temperature is in the range of preferably room temperature to 120° C., more preferably room temperature to 100° C., still more preferably room temperature to 70°

C. The heat treatment time is in the range of preferably 5 seconds to 2 hours, more preferably 10 seconds to 40 minutes, still more preferably 20 seconds to 20 minutes. In order to raise the temperature of the layer of the polymerizable liquid crystal composition up to the prescribed temperature, the heat treatment time is preferably not less than 5 seconds. In order to avoid lowering of productivity, the heat treatment time is preferably not more than 2 hours.

The state of nematic alignment of the polymerizable liquid crystal composition formed in the film is fixed by polymerizing the polymerizable liquid crystal compounds in the film by means of light irradiation. For the light irradiation, electron rays, ultraviolet rays, visible rays, infrared rays (heat rays), etc. are employable. Usually, ultraviolet rays or visible rays are employed. Although the wavelength of light used for the light irradiation is not specifically restricted, it is in the range of preferably 150 to 500 nm, more preferably 250 to 450 nm, still more preferably 300 to 400 nm.

Examples of light sources include low-pressure mercury lamp (germicidal lamp, fluorescent chemical lamp, black light), high-pressure discharge lamp (high-pressure mercury lamp, metal halide lamp), and short arc discharge lamp (ultrahigh pressure mercury lamp, xenon lamp, mercury xenon lamp). Of these, metal halide lamp, xenon lamp and high-pressure mercury lamp are preferable.

The wavelength region of the irradiation light source may be selected by providing a filter or the like between the light source and the film layer of the polymerizable liquid crystal composition and passing light of a specific wavelength region only. The quantity of light emitted from the light source is in the range of preferably 2 to 5000 mJ/cm$^2$, more preferably 10 to 3000 mJ/cm$^2$, still more preferably 100 to 2000 mJ/cm$^2$. The temperature conditions in the light irradiation are preferably set in the same manner as in the aforesaid heat treatment.

In the case where the liquid crystal film wherein the alignment layer composed of the polymerizable liquid crystal composition has been polymerized by means of light, heat or the like is used for various optical elements or applied to an optical compensation element used in a liquid crystal display device, control of a distribution of tilt angles in the thickness direction becomes extremely important.

One example of a method to control the tilt angles is a method of controlling the types and the compositional ratio of the liquid crystal compounds used for the polymerizable liquid crystal composition. The tilt angles can be controlled also by adding other components to the polymerizable liquid crystal composition. The tilt angles of the liquid crystal film can be controlled also by the type of a solvent added to the polymerizable liquid crystal composition, the solute concentration in the solution of the polymerizable liquid crystal composition, the type and the amount of a surface active agent that is added as one of other components, etc. Further, the tilt angles of the liquid crystal film can be controlled also by the type of the substrate, the rubbing conditions, the drying conditions of the coating film, the heat treatment conditions thereof, etc. Moreover, the tilt angles of the liquid crystal film are influenced by the irradiation atmosphere in the photopolymerization step after the alignment, the temperature in the irradiation step, etc. That is to say, it is thought that almost all the conditions in the production process of the liquid crystal film have influence on the tilt angles. Therefore, by optimizing the polymerizable liquid crystal composition and by properly selecting various conditions in the production process of the liquid crystal film, arbitrary tilt angles can be obtained.

In order to stably obtain uniform homeotropic alignment, the content of the compound (1) in the polymerizable liquid crystal composition is in the range of 3 to 70% by weight, preferably 5 to 50% by weight, more preferably 5 to 35% by weight, with the proviso that the total amount of the polymerizable liquid crystal compounds is 100% by weight. In order to maintain mechanical properties of the liquid crystal film, such as heat resistance, the content of the compound (1) is preferably in the range of about 10 to 35% by weight.

A preferred thickness of the liquid crystal film varies depending upon retardation corresponding to the desired element and birefringence ratio of the liquid crystal film. Therefore, the range of the thickness cannot be determined strictly. However, the thickness is in the range of preferably 0.05 to 50 µm, more preferably 0.1 to 20 µm, still more preferably 0.5 to 10 µm.

The haze value of the liquid crystal film is preferably not more than 1.5%, more preferably not more than 1.0%, and the transmittance thereof is preferably not less than 80%, more preferably not less than 95%. These transmittance conditions are preferably satisfied in the region of visible light.

[Uses]

The liquid crystal film of the invention is useful as an optical compensation element applied to liquid crystal display devices (particularly liquid crystal display devices of active matrix type and passive matrix type). Examples of types of the liquid crystal devices in which the liquid crystal film of the invention is suitably used as an optical compensation film include TN type (twisted nematic), STN type (super twisted nematic), ECB type (electrically controlled birefringence), OCB type (optically compensated birefringence), DAP type (deformation effect of aligned phase), CSH type (color super homeotropic), VAN/VAC type (vertically aligned nematic/choresteric), OMI type (optical mode interference) and SBE type (super birefringence effect) Further, the liquid crystal film can be used also as a phase retarder for display devices of guest-host type, IPS type (in-plane switching), ferroelectric type, antiferroelectric type and the like. The optimum values of parameters required for the liquid crystal film, such as distribution of tilt angles in the thickness direction and thickness of the film, strongly depend upon the type of a liquid crystal display device to be compensated and its optical parameters, so that they vary depending upon the type of the device.

The liquid crystal film of the invention can be used as an optical element by uniting the film and a polarizing plate in a body, and in this case, the film is arranged outside a liquid crystal cell.

EXAMPLES

The present invention is further described with reference to the following examples, but it should be construed that the invention is in no way limited to those examples.

[Evaluation]

Evaluation methods carried out in the following examples are described below.

<Uniformity of Homeotropic Alignment>

Two polarizing plates were placed in a state of crossed Nicols, and between them a liquid crystal film was interposed. A state where passing of light derived from alignment defect of the liquid crystal was not visually confirmed (dark field)

when the liquid crystal film was observed from the front was regarded as a state of uniform alignment. The film was inclined from this state, and light was allowed to obliquely enter the film. Then, the film was observed in a state of crossed Nicols similarly to the above, and when transmission of light was confirmed, the film was considered to have homeotropic alignment.

<Measurement of Contact Angle>

Using a contact angle meter CA-A (manufactured by Kyowa Interface Science Co., Ltd.), a contact angle of pure water dropped on a substrate was measured at 25° C.

<Measurement of Imidization Ratio>

First, FT-IR of a polyimide based polymer film separately prepared by heating the polymer at 280° C. for 30 minutes was measured, and a value of an area ratio (Abs1770/Abs1500) of an absorption spectrum of an imide group in the vicinity of 1770 cm$^{-1}$ to an absorption spectrum of a phenyl group in the vicinity of 1500 cm$^{-1}$ was calculated. This value was taken as a value in case of an imidization ratio of 100%. Then, a value of an area ratio (Abs1770/Abs1500) of a polyimide based polymer film as the subject of evaluation was calculated, and from a relative value to the value in case of an imidization ratio of 100%, an imidization ratio was determined.

[Preparation Example of Polymerizable Liquid Crystal Composition]

The compound (1-1-1) used hereinafter was synthesized in accordance with a process described in Japanese Patent Laid-Open Publication No. 320317/2005 and by replacing 3-fluoro-4-trifluoromethoxyphenol with a raw material having cyanobiphenyl. The compound (1-1-5) was synthesized by a process described in Japanese Patent Laid-Open Publication No. 320317/2005. The compound (1-2-1) was synthesized by a process described in Japanese Patent Laid-Open Publication No. 117564/2006. The compound (1-3-1) was synthesized by a process described in Japanese Patent Laid-Open Publication No. 241116/2006. The compound (2-1-1) was synthesized by a process described in "Macromolecules" 1993, 26, 1244-1247.

The compound (2-2-22) was synthesized by a process described in Japanese Patent Laid-Open Publication No. 60373/2005.

Preparation Example 1

To a mixture of the following polymerizable liquid crystal compounds, an initiator (DTS-102, available from Midori Kagaku Co., Ltd.) was added in a weight ratio of 0.03 based on the total amount of the polymerizable liquid crystal compounds. To the resulting mixture, a mixed solvent of toluene and cyclohexanone (mixing ratio by weight: 1/1 (toluene/cyclohexanone)) was added to give a 25 wt % solution, whereby a polymerizable liquid crystal composition 1 was obtained.

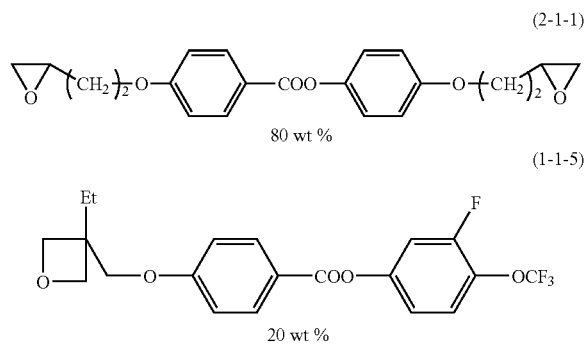

Preparation Example 2

A polymerizable liquid crystal composition 2 was prepared in the same manner as in Preparation Example 1, except that a mixture of the following polymerizable liquid crystal compounds was used.

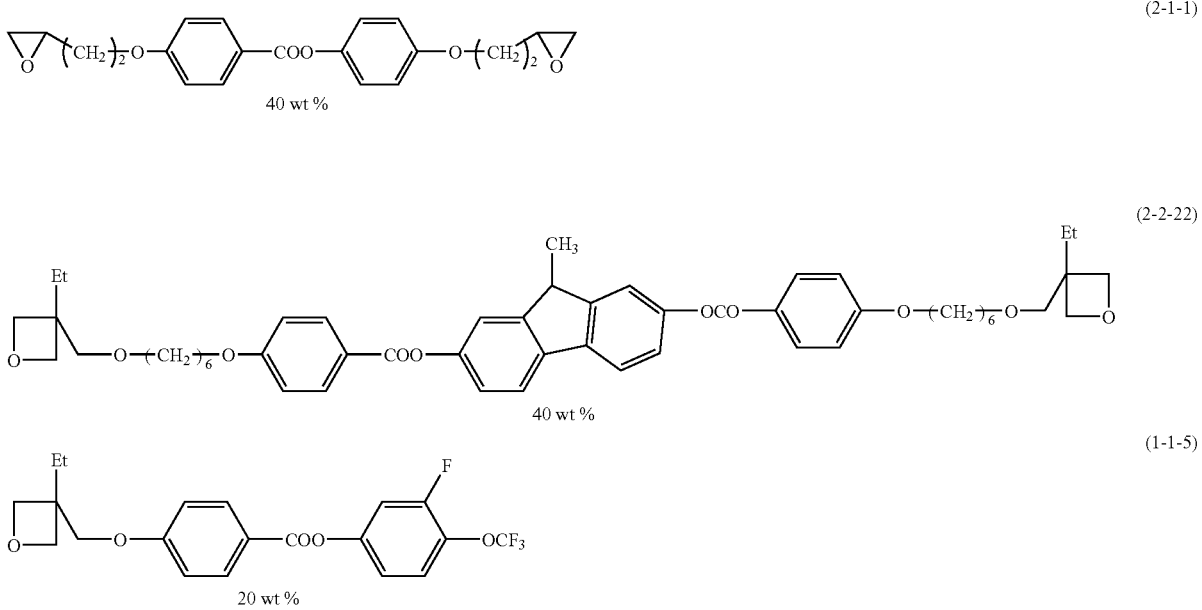

Preparation Example 3

A polymerizable liquid crystal composition 3 was prepared in the same manner as in Preparation Example 1, except that a mixture of the following polymerizable liquid crystal compounds was used.

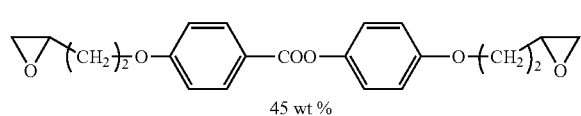
45 wt %
(2-1-1)

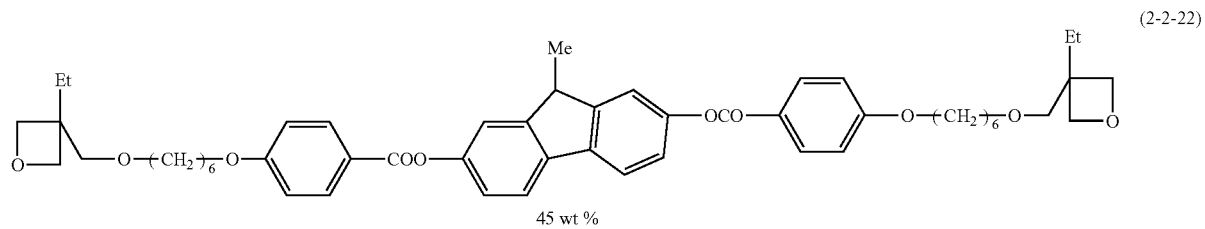
45 wt %
(2-2-22)

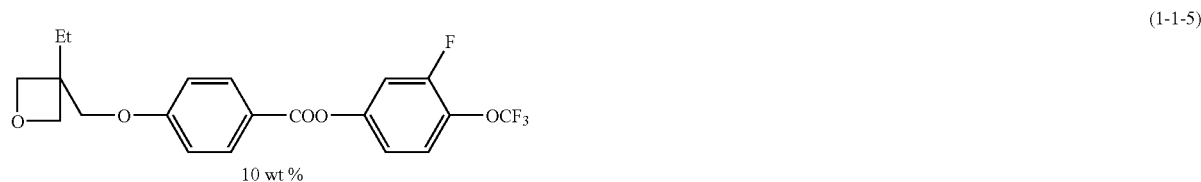
10 wt %
(1-1-5)

Preparation Example 4

A polymerizable liquid crystal composition 4 was prepared in the same manner as in Preparation Example 1, except that a mixture of the following polymerizable liquid crystal compounds was used.

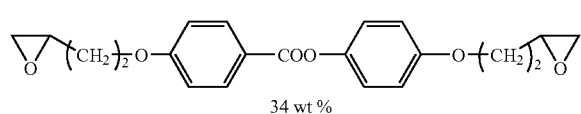
34 wt %
(2-1-1)

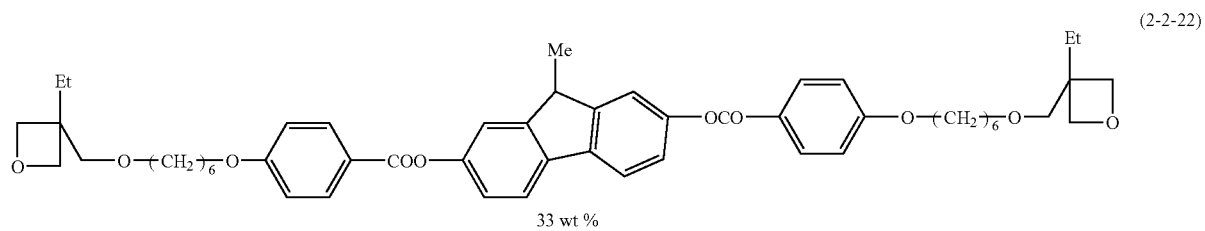
33 wt %
(2-2-22)

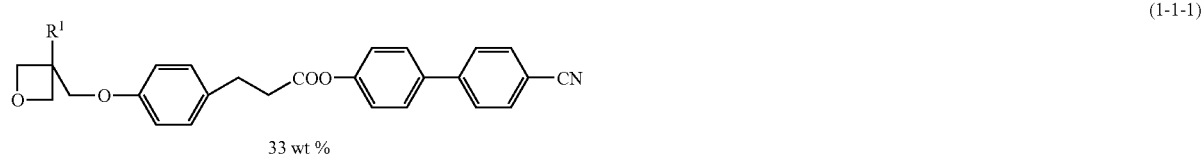
33 wt %
(1-1-1)

Preparation Example 5

A polymerizable liquid crystal composition 5 was prepared in the same manner as in Preparation Example 1, except that a mixture of the following polymerizable liquid crystal compounds was used.

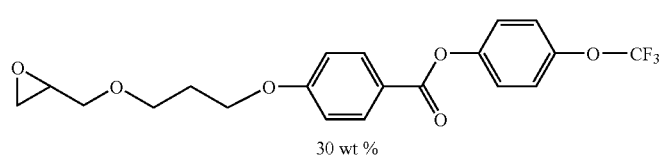

30 wt %

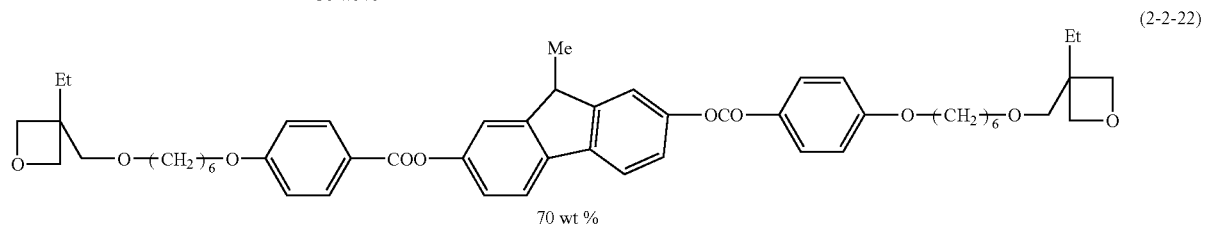

70 wt %

Preparation Example 6

A polymerizable liquid crystal composition 6 was prepared in the same manner as in Preparation Example 1, except that a mixture of the following polymerizable liquid crystal compounds was used.

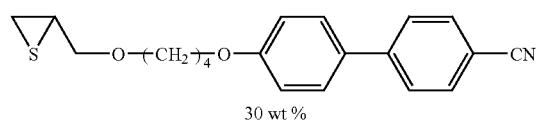

30 wt %

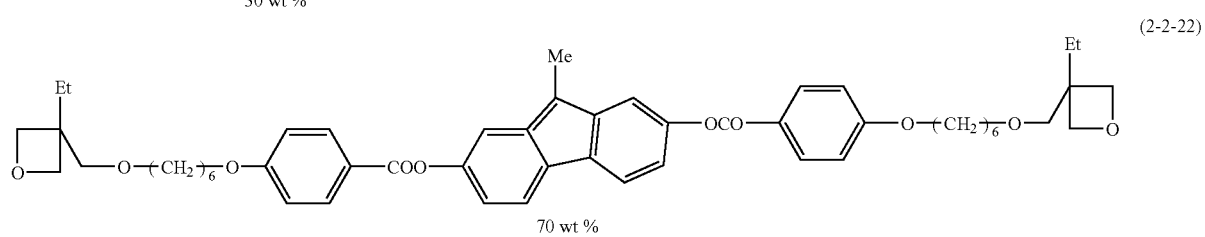

70 wt %

Preparation Example of Polyimide Based Varnish

Meanings of symbols used hereinafter are as follows.
DDM: 4,4'-diaminodiphenylmethane
DDEt: 4,4'-diaminodiphenylethane
APM-CH: 1,1-bis(4-((4-aminophenyl)methyl)phenyl)-4-heptylcyclohexane
DABD: 5-(4-(4-(4-pentylcyclohexyl)cyclohexyl)phenyl)methyl-1,3-diaminobenzene
CBDA: cyclobutanetetracarboxylic dianhydride
PMDA: pyromellitic dianhydride
NMP: N-methyl-2-pyrrolidone
BC: butyl cellosolve Molecular weight of a polyimide based varnish was measured by GPC using polystyrene as a standard solution and using DMF as an eluting solution.

Preparation Example 7

In a 200 ml four-necked flask, DDM (3.02 g, $1.52 \times 10^{-2}$ mol) and dehydrated NMP (54.0 g) were placed, then they were stirred in a stream of dry nitrogen to give a solution, and the solution temperature was lowered to 5° C. To the solution, CBDA (2.98 g, $1.52 \times 10^{-2}$ mol) was added, and reaction was carried out for 30 hours. In this reaction, the temperature of the reaction system was not particularly controlled. Finally, BC (40.0 g) was added to prepare a polyamic acid varnish A1 having a polymer component concentration of 6.0% by weight. The resulting polyamic acid had a weight-average molecular weight of 50,000. The weight-average molecular weight was measured by a GPC measuring apparatus (Chromatopac C-R7A, manufactured by Shimadzu Corporation) at a column temperature of 50° C.

In the preparation of the varnish, thickening reaction was allowed to proceed with checking the viscosity, and when increase of viscosity was lessened, BC was added to terminate progress of the thickening reaction. After the addition of BC, viscosity of the varnish was controlled by heating, and when the viscosity became 60 mPa·s, heating was terminated. The viscosity was measured at 25° C. by the use of an E-type viscometer. The resulting varnish was stored at a low temperature.

Preparation Example 8

A polyamic acid varnish A2 was prepared in the same manner as in Preparation Example 7, except that DDEt (1.07 g, $5.02 \times 10^{-3}$ mol) and APM-CH (2.74 g, $5.02 \times 10^{-3}$ mol)

were used as diamine, instead of DDM, and PMDA (2.19 g, $1.00 \times 10^{-2}$ mol) was used as tetracarboxylic dianhydride, instead of CBDA. The resulting polyamic acid had a weight-average molecular weight of 60,000.

Preparation Example 9

A polyamic acid varnish A3 was prepared by mixing the polyamic acid varnish A1 obtained in Preparation Example 7 and the polyamic acid varnish A2 obtained in Preparation Example 8 so that the weight ratio between the polymer components contained in the varnishes should became 9:1 (A1:A2).

Example 1

The polyamic acid varnish A1 obtained in Preparation Example 7 was applied onto a glass substrate (Matsunami slide glass, thickness: 1.0 mm) by spin coating, then subjected to pre-baking at 80° C. for 3 minutes and then heated (main baking) at 110° C. for 30 minutes to form a polymer film. The resulting polymer film had an imidization ratio of 5%. From the fact that the imidization ratio was less than 100%, it was confirmed that there was a carboxyl group in the polymer molecular chain of the polymer film.

Subsequently, onto the polymer film which had not been subjected to surface treatment such as rubbing, the polymerizable liquid crystal composition 1 obtained in Preparation Example 1 was applied by spin coating, and the coating film was heated at 70° C. for 3 minutes to remove the solvent. Then, the resulting film was irradiated with light having an intensity of 30 mW/cm$^2$ (365 nm) in the atmosphere at room temperature using an ultra-high pressure mercury lamp of 250 W to polymerize the polymerizable liquid crystal compounds, whereby a liquid crystal film having a transparent appearance was obtained.

When the resulting liquid crystal film was interposed between two polarizing plates placed in a state of crossed Nicols, the liquid crystal film was in a dark field, and when the liquid crystal film was inclined from a direction perpendicular to the film surface, a phase difference was ascertained. Therefore, it was confirmed that a liquid crystal film having uniform homeotropic alignment had been obtained.

Example 2

A liquid crystal film was prepared in the same manner as in Example 1, except that the polymerizable liquid crystal composition 2 was used instead of the polymerizable liquid crystal composition 1. The resulting liquid crystal film had a transparent appearance, and it was confirmed that the liquid crystal film had uniform homeotropic alignment.

Example 3

A liquid crystal film was prepared in the same manner as in Example 1, except that the polymerizable liquid crystal composition 3 was used instead of the polymerizable liquid crystal composition 1. The resulting liquid crystal film had a transparent appearance, and it was confirmed that the liquid crystal film had uniform homeotropic alignment.

Example 4

A liquid crystal film was prepared in the same manner as in Example 1, except that the polymerizable liquid crystal composition 4 was used instead of the polymerizable liquid crystal composition 1. The resulting liquid crystal film had a transparent appearance, and it was confirmed that the liquid crystal film had uniform homeotropic alignment.

Example 5

A liquid crystal film was prepared in the same manner as in Example 1, except that the polymerizable liquid crystal composition 5 was used instead of the polymerizable liquid crystal composition 1. The resulting liquid crystal film had a transparent appearance, and it was confirmed that the liquid crystal film had uniform homeotropic alignment.

Example 6

A liquid crystal film was prepared in the same manner as in Example 1, except that the polymerizable liquid crystal composition 6 was used instead of the polymerizable liquid crystal composition 1. The resulting liquid crystal film had a transparent appearance, and it was confirmed that the liquid crystal film had uniform homeotropic alignment.

Example 7

A liquid crystal film was prepared in the same manner as in Example 1, except that the polyamic acid varnish A3 was used instead of the polyamic acid varnish A1 and the imidization ratio of the resulting polymer film was 8%. The resulting liquid crystal film had a transparent appearance, and it was confirmed that the liquid crystal film had uniform homeotropic alignment.

Example 8

A liquid crystal film was prepared in the same manner as in Example 7, except that the polymerizable liquid crystal composition 2 was used instead of the polymerizable liquid crystal composition 1. The resulting liquid crystal film had a transparent appearance, and it was confirmed that the liquid crystal film had uniform homeotropic alignment.

Example 9

A liquid crystal film was prepared in the same manner as in Example 7, except that the polymerizable liquid crystal composition 4 was used instead of the polymerizable liquid crystal composition 1. The resulting liquid crystal film had a transparent appearance, and it was confirmed that the liquid crystal film had uniform homeotropic alignment.

Example 10

A liquid crystal film was prepared in the same manner as in Example 1, except that the main baking of the coating film composed of the polyamic acid varnish A1 was carried out at 150° C. for 30 minutes and the imidization ratio of the resulting polymer film was 15%. The resulting liquid crystal film had a transparent appearance, and it was confirmed that the liquid crystal film had uniform homeotropic alignment.

Example 11

A liquid crystal film was prepared in the same manner as in Example 10, except that the polymerizable liquid crystal composition 2 was used instead of the polymerizable liquid crystal composition 1. The resulting liquid crystal film had a transparent appearance, and it was confirmed that the liquid crystal film had uniform homeotropic alignment.

Comparative Example 1

A liquid crystal film was prepared in the same manner as in Example 1, except that a polymerizable liquid crystal composition 1' prepared without using the compound (1-1-5) in Preparation Example 1 was used instead of the polymerizable liquid crystal composition 1. As a result, the liquid crystal was not aligned, and the resulting film was opaque and had a problem of appearance.

Comparative Example 2

A liquid crystal film was prepared in the same manner as in Example 2, except that a polymerizable liquid crystal composition 2' prepared without using the compound (1-1-5) in Preparation Example 2 was used instead of the polymerizable liquid crystal composition 2. As a result, the liquid crystal was not aligned, and the resulting film was opaque and had a problem of appearance.

Comparative Example 3

A liquid crystal film was prepared in the same manner as in Example 4, except that a polymerizable liquid crystal composition 4' prepared without using the compound (1-1-1) in Preparation Example 4 was used instead of the polymerizable liquid crystal composition 4. As a result, the liquid crystal was not aligned, and the resulting film was opaque and had a problem of appearance.

Comparative Example 4

A liquid crystal film was prepared in the same manner as in Example 5, except that a polymerizable liquid crystal composition 5' prepared without using the compound (1-2-1) in Preparation Example 5 was used instead of the polymerizable liquid crystal composition 5. As a result, the liquid crystal was not aligned, and the resulting film was opaque and had a problem of appearance.

Comparative Example 5

A liquid crystal film was prepared in the same manner as in Example 6, except that a polymerizable liquid crystal composition 6' prepared without using the compound (1-3-1) in Preparation Example 6 was used instead of the polymerizable liquid crystal composition 6. As a result, the liquid crystal was not aligned, and the resulting film was opaque and had a problem of appearance.

Comparative Example 6

A liquid crystal film was prepared in the same manner as in Example 1, except that the main baking of the coating film composed of the polyamic acid varnish A1 was carried out at 210° C. for 30 minutes and the imidization ratio of the resulting polymer film was 75%. As a result, the liquid crystal was not aligned, and the resulting film was opaque and had a problem of appearance.

Example 12

Onto a saponified TAC film (available from Goju Sangyo K.K., thickness: 80 μm, contact angle with water: 30°) as a substrate, "SF330" (available from Chisso Corporation, used by diluting a 50 wt % aqueous solution to give a 25 wt % aqueous solution) as a partial hydrolyzate of 3-aminopropyltriethoxysilane was applied by spin coating. Thereafter, the coating film was dried at 100° C. for 3 minutes to form a polymer film. The contact angle of the substrate surface on which the polymer film had been formed was 25°. Then, application of the polymerizable liquid crystal composition 1 was carried out in the same manner as in Example 1. The resulting liquid crystal film had a transparent appearance, and it was confirmed that the liquid crystal film had uniform homeotropic alignment.

Example 13

Onto a cycloolefin based resin film (thickness: 50 μm, ZEONOR film of NEONOR1600R, available from Nippon Zeon Co., Ltd., see Japanese Patent Laid-Open Publication No. 4641/2004) having been subjected to hydrophilic treatment by plasma treatment, the polymerizable liquid crystal composition 2 obtained in Preparation Example 2 was applied in a wet thickness of 12 μm by means of a wire bar. The hydrophilic treatment (plasma treatment) of the surface was carried out using an atmospheric pressure plasma surface-treating apparatus (AP-T02-L). The plasma discharge conditions were set in accordance with Japanese Patent Laid-Open Publication No. 226616/2002. The degree of the hydrophilic treatment was evaluated by measuring a contact angle (25° C.) of pure water dropped on the cycloolefin based resin substrate. As a result, the contact angle before the treatment was 97°, and the contact angle after the treatment was 40°. Then, the coating film was heated on a hot plate at 70° C. for 3 minutes to remove the solvent, and thereafter, UV irradiation was carried out in the atmosphere to obtain a liquid crystal film. The resulting liquid crystal film had a transparent appearance, and it was confirmed that the liquid crystal film had uniform homeotropic alignment.

Example 14

A liquid crystal film was prepared in the same manner as in Example 13, except that a polymerizable liquid crystal composition obtained by changing the mixing ratio (by weight) of the mixed solvent in the polymerizable liquid crystal composition 2 to 2/1 (toluene/cyclohexanone) in Preparation Example 2 was used. The resulting liquid crystal film had a transparent appearance, and it was confirmed that the liquid crystal film had uniform homeotropic alignment.

Example 15

A liquid crystal film was obtained in the same manner as in Example 13, except that a polymerizable liquid crystal composition obtained by changing the mixed solvent in the polymerizable liquid crystal composition 2 to a solvent of cyclohexanone only in Preparation Example 2 was used. The resulting liquid crystal film had a transparent appearance, and it was confirmed that the liquid crystal film had uniform homeotropic alignment.

Comparative Example 7

A liquid crystal film was prepared in the same manner as in Example 13, except that a polymerizable liquid crystal composition 2' prepared without using the compound (1-1-5) in Preparation Example 2 was used instead of the polymerizable liquid crystal composition 2. As a result, the liquid crystal was not aligned, and the resulting film was opaque and had a problem of appearance.

Comparative Example 8

A liquid crystal film was prepared in the same manner as in Example 13, except that a polymerizable liquid crystal composition obtained by changing the solvent in the polymerizable liquid crystal composition 2 to toluene only in Preparation Example 2 was used. As a result, a liquid crystal film having homeotropic alignment could be obtained. However, deformation (curling) of the cycloolefin based resin substrate was observed, and it was confirmed that the substrate was attacked by the solvent.

From the results of the examples and the comparative examples, it has been confirmed that by the use of a polymerizable liquid crystal composition containing a polymerizable liquid crystal compound having a polar group at the molecular end and by the use of a solvent containing a polar solvent, a liquid crystal film having uniform homeotropic alignment is obtained on a substrate that has been surface-treated so as to have polarity.

What is claimed is:

1. A homeotropically aligned liquid crystal film obtained by applying a polymerizable liquid crystal composition containing at least one compound selected from the group consisting of polymerizable liquid crystal compounds represented by the following formula (1-1) to the following formula (1-3) onto a substrate having a polar surface, and polymerizing the composition:

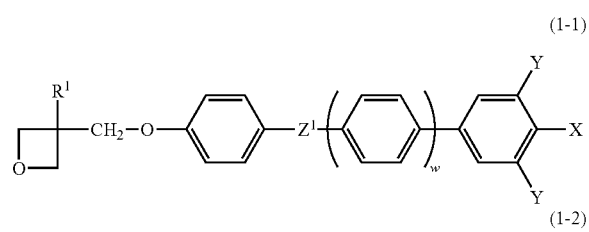

(1-1)

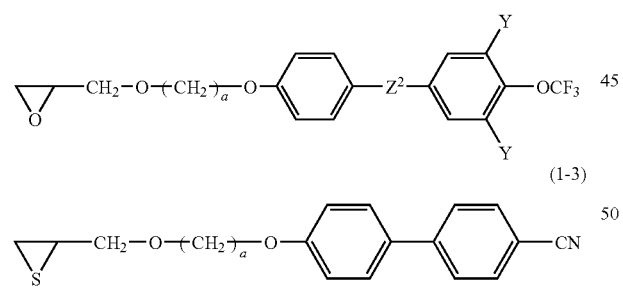

(1-2)

(1-3)

wherein $R^1$ is methyl or ethyl; $Z^1$ is a single bond, —COO—, —OCO—, —CH=CH—COO— or —CH$_2$CH$_2$—COO—; $Z^2$ is —COO— or —OCO—; each Y is independently hydrogen or fluorine; X is —OCF$_3$ or —CN; w is 0, 1 or 2; and a is an integer of 1 to 10.

2. The liquid crystal film as claimed in claim 1, wherein the polymerizable liquid crystal composition contains at least one compound selected from the group consisting of polymerizable liquid crystal compounds represented by the formula (1-1) to the formula (1-3) and at least one compound selected from the group consisting of polymerizable liquid crystal compounds represented by the following formula (2-1) and the following formula (2-2):

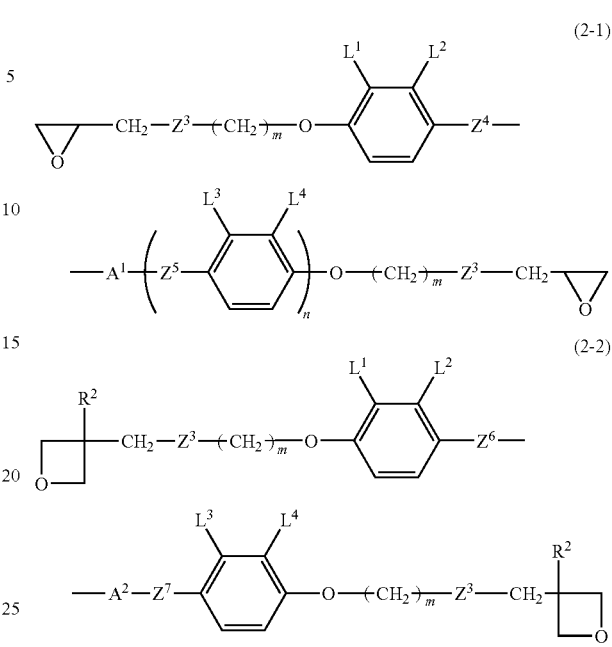

(2-1)

(2-2)

wherein each $R^2$ is independently methyl or ethyl; $Z^3$ is a single bond or —O—; $Z^4$ to $Z^7$ are each independently —COO—, —OCO—, —CH$_2$CH$_2$COO—, —OCOCH$_2$CH$_2$—, —CH=CHCOO—, —OCOCH=CH—, —CH$_2$CH$_2$—, —C≡C—, —CH$_2$O— or —OCH$_2$—; $L^1$ to $L^4$ are each independently hydrogen, fluorine, chlorine, methyl, trifluoromethyl or cyano; m is an integer of 0 to 10, and when m is 0, $Z^3$ is a single bond; n is 0 or 1; $A^1$ is 1,4-phenylene, 3-methyl-1,4-phenylene, 2-trifluoromethyl-1,4-phenylene, 3-trifluoromethyl-1,4-phenylene, 2,3-bis(trifluoromethyl)-1,4-phenylene, 3,5-dimethylbiphenyl-4,4'-diyl, 3,5-dimethylterphenyl-4,4''-diyl, 9-methylfluorene-2,7-diyl or 9,9-dimethylfluorene-2,7-diyl; and $A^2$ is any one of groups represented by the following formulas:

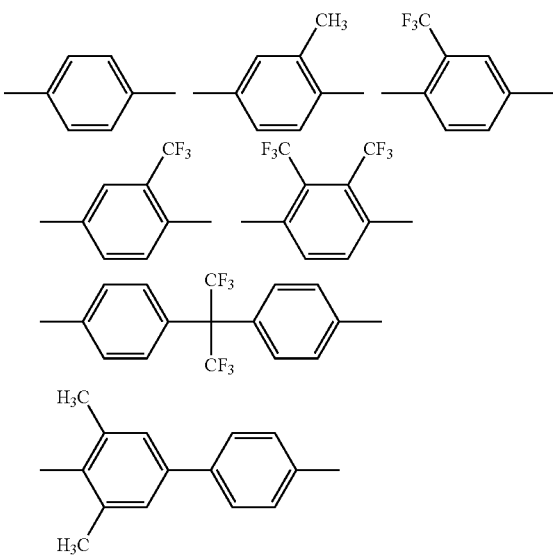

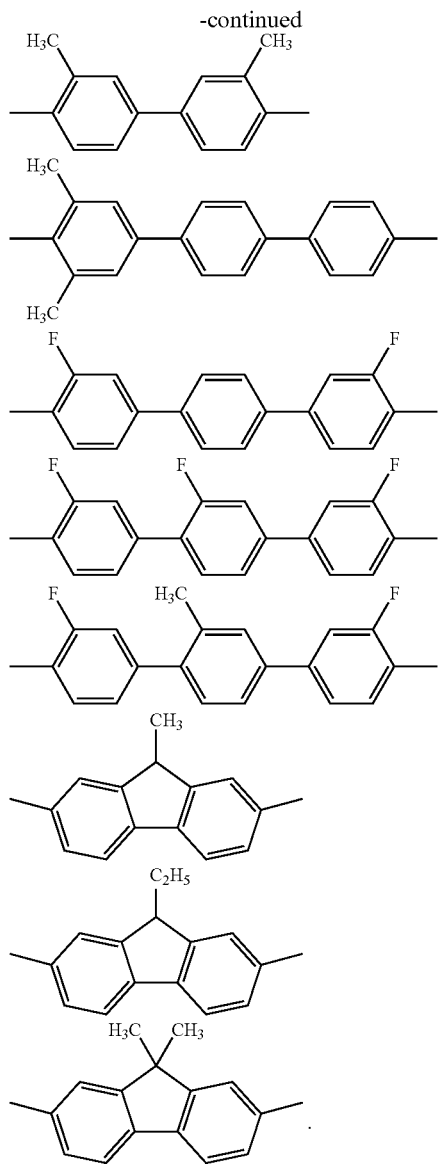

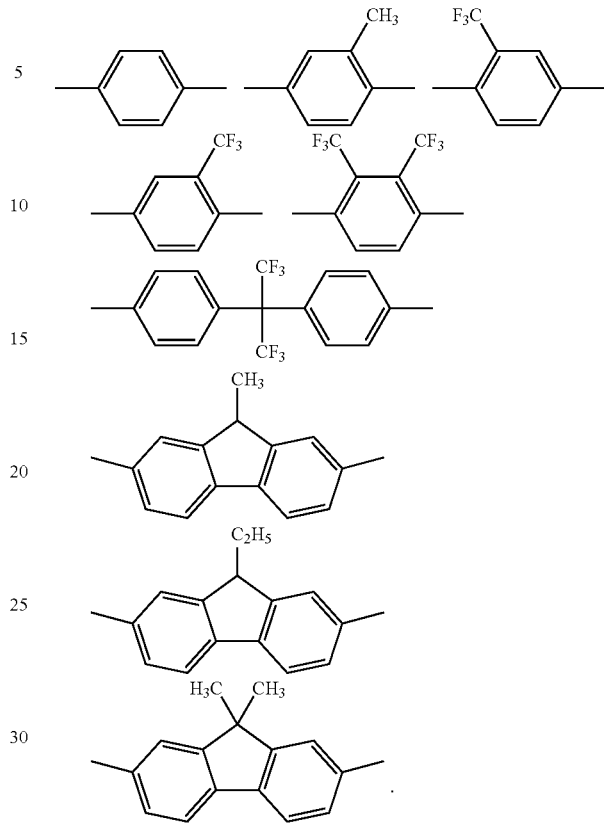

3. The liquid crystal film as claimed in claim 2, wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, and in the formula (2-1) and the formula (2-2), each $R^2$ is independently methyl or ethyl; $Z^3$ is a single bond or —O—; $Z^4$ to $Z^7$ are each independently —COO—, —OCO—, —CH$_2$CH$_2$COO—, —OCOCH$_2$CH$_2$—, —CH=CHCOO— or —OCOCH=CH—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 2-trifluoromethyl-1,4-phenylene, 3-trifluoromethyl-1,4-phenylene, 2,3-bis(trifluoromethyl)-1,4-phenylene, 9-methylfluorene-2,7-diyl or 9,9-dimethylfluorene-2,7-diyl; and $A^2$ is any one of groups represented by the following formulas:

4. The liquid crystal film as claimed in claim 2, wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, and in the formula (2-1) and the formula (2-2), $Z^3$ is a single bond or —O—; $Z^4$ and $Z^5$ are each independently —COO—, —OCO—, —CH$_2$CH$_2$COO—, —OCOCH$_2$CH$_2$—, —CH=CHCOO— or —OCOCH=CH—; $Z^6$ and $Z^7$ are each independently —COO—, —OCO—, —CH$_2$CH$_2$COO— or —OCOCH$_2$CH$_2$—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 9-methylfluorene-2,7-diyl or 9,9-dimethylfluorene-2,7-diyl; and $A^2$ is 9-methylfluorene-2,7-diyl or 9,9-dimethylfluorene-2,7-diyl.

5. The liquid crystal film as claimed in claim 2, wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN; w is 0 or 1; and a is an integer of 1 to 10, in the formula (2-1) and the formula (2-2), $Z^3$ is a single bond or —O—; $Z^4$ is —COO—; $Z^5$ is —OCO—; $Z^6$ is —COO—; $Z^7$ is —OCO—; $L^1$ to $L^4$ are each independently hydrogen or fluorine; m is an integer of 0 to 10, and when m is 0, $Z^3$ is a single bond; n is 0 or 1; $A^1$ is 1,4-phenylene, 3-methyl-1,4-phenylene, 9-methylfluorene-2,7-diyl or 9,9-dimethylfluorene-2,7-diyl; and $A^2$ is 9-methylfluorene-2,7-diyl or 9,9-dimethylfluorene-2,7-diyl, and the ratio of the compounds represented by the formula (1-1) to the formula (1-3) is in the range of 3 to 70% by weight based on the total amount 100% by weight of the compounds represented by the formula (1-1) to the formula (1-3) and the compounds represented by the formula (2-1) and the formula (2-2).

6. The liquid crystal film as claimed in claim 2, wherein in the formula (1-1) to the formula (1-3), $R^1$ is methyl or ethyl; $Z^1$ is a single bond, —COO— or —OCO—; $Z^2$ is —COO— or —OCO—; each Y is independently hydrogen or fluorine; X is —OCF$_3$ or —CN: w is 0 or 1; and a is an integer of 1 to 10, in the formula (2-1), m is an integer of 0 to 3; n is 0; $Z^3$ is a single bond; $Z^4$ is —COO—; $L^1$ and $L^2$ are hydrogen; and $A^1$ is 1,4-phenylene, in the formula (2-2), $Z^3$ is a single bond or —O—; $Z^6$ is —COO—; $Z^7$ is —OCO—; $L^1$ to $L^4$ are each independently hydrogen or fluorine; m is an integer of 0 to 10, and when m is 0, $Z^3$ is a single bond; n is 0 or 1; and $A^2$ is 9-methylfluorene-2,7-diyl, and the ratio of the compounds represented by the formula (1-1) to the formula (1-3) is in the range of 5 to 50% by weight based on the total amount 100% by weight of the compounds represented by the formula (1-1) to the formula (1-3) and the compounds represented by the formula (2-1) and the formula (2-2).

7. The liquid crystal film as claimed in claim 6, wherein m in the formula (2-2) is an integer of 4 to 8, and the ratio of the compounds represented by the formula (1-1) to the formula (1-3) is in the range of 5 to 35% by weight based on the total amount 100% by weight of the compounds represented by the formula (1-1) to the formula (1-3) and the compounds represented by the formula (2-1) and the formula (2-2).

8. The liquid crystal film as claimed in claim 1, wherein the substrate having a polar surface is a substrate having been surface-treated by any one treatment of a film-forming treatment using a polymer having a polar group, a corona treatment and a plasma treatment.

9. The liquid crystal film as claimed in claim 1, wherein the substrate having a polar surface is a substrate having been surface-treated by a combination of two or more treatments of a film-forming treatment using a polymer having a polar group, a corona treatment and a plasma treatment.

10. The liquid crystal film as claimed in claim 8, wherein the polymer having a polar group has a carboxyl group and/or an amino group in a molecular chain.

11. The liquid crystal film as claimed in claim 8, wherein the polymer having a polar group is a polyimide based polymer.

12. The liquid crystal film as claimed in claim 11, wherein the polyimide based polymer contains at least one component selected from the group consisting of polyamic acid, polyamic acid amide and polyamic acid ester.

13. The liquid crystal film as claimed in claim 11, wherein the polyimide based polymer is polyamic acid.

14. The liquid crystal film as claimed in claim 8, wherein the polymer having a polar group is a water-soluble silsesquioxane derivative having an amino group.

15. The liquid crystal film as claimed in claim 14, wherein the water-soluble silsesquioxane derivative having an amino group is a partial hydrolyzate of a silicon compound having an amino group-containing group and three hydrolyzable groups.

16. The liquid crystal film as claimed in claim 15, wherein the water-soluble silsesquioxane derivative having an amino group is a partial hydrolyzate of trialkoxysilane having an amino group.

17. The liquid crystal film as claimed in claim 1, wherein the substrate is a glass substrate.

18. The liquid crystal film as claimed in claim 1, wherein the substrate is a plastic substrate.

19. The liquid crystal film as claimed in claim 18, wherein the plastic substrate comprises polyimide, polyamideimide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyallylate, acrylic resin, polyvinyl alcohol, polypropylene, cellulose, triacetyl cellulose, partial saponification product of triacetyl cellulose, epoxy resin, phenolic resin or cycloolefin based resin.

20. The liquid crystal film as claimed in claim 1, wherein the polymerizable liquid crystal composition contains a solvent, and the solvent contains a polar solvent in an amount of not less than 5% by weight based on the whole amount of the solvent.

21. The liquid crystal film as claimed in claim 20, wherein the polar solvent is at least one solvent selected from the group consisting of ketones, acetates, ethers, cellosolves, esters and alcohols.

22. A process for producing a homeotropically aligned liquid crystal film, comprising applying the polymerizable liquid crystal composition of claim 1 onto a substrate having a polar surface and polymerizing the composition to form a homeotropically aligned state.

23. The process as claimed in claim 22, wherein the substrate having a polar surface is a substrate having been surface-treated by a film-forming treatment using a polymer having a polar group, and the resulting film is a film formed by baking a coating film composed of the polymer at a temperature of not higher than 180° C.

24. The process as claimed in claim 23, wherein the polymer having a polar group is a polyimide based polymer having an imidization ratio of not more than 45%.

25. The process as claimed in claim 22, wherein the substrate having a polar surface is a cycloolefin based resin substrate having been subjected to a plasma treatment.

26. An optical compensation element having the homeotropically aligned liquid crystal film of claim 1.

27. An optical compensation element having the homeotropically aligned liquid crystal film produced by the process of claim 22.

28. An optical element having the homeotropically aligned liquid crystal film of claim 1 and a polarizing plate.

29. An optical element having the homeotropically aligned liquid crystal film produced by the process of claim 22 and a polarizing plate.

30. A liquid crystal display device having the optical compensation element of claim 26 inside or outside a liquid crystal cell.

31. A liquid crystal display device having the optical element of claim 28 outside a liquid crystal cell.

32. The liquid crystal film as claimed in claim 9, wherein the polymer having a polar group has a carboxyl group and/or an amino group in a molecular chain.

33. The liquid crystal film as claimed in claim 9, wherein the polymer having a polar group is a polyimide based polymer.

34. The liquid crystal film as claimed in claim 9, wherein the polymer having a polar group is a water-soluble silsesquioxane derivative having an amino group.

35. A liquid crystal display device having the optical compensation element of claim 27 inside or outside a liquid crystal cell.

36. A liquid crystal display device having the optical element of claim 29 outside a liquid crystal cell.

* * * * *